United States Patent [19]
Smith, Sr. et al.

[11] Patent Number: 6,144,744
[45] Date of Patent: *Nov. 7, 2000

[54] METHOD AND APPARATUS FOR THE SECURE TRANSFER OF OBJECTS BETWEEN CRYPTOGRAPHIC PROCESSORS

[75] Inventors: Ronald M. Smith, Sr., Wappingers Falls; Edward J. D'Avignon, Kingston, both of N.Y.; Robert S. DeBellis, Raleigh, N.C.; Phil Chi-Chung Yeh, Poughkeepsie, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/885,612

[22] Filed: Jun. 30, 1997

[51] Int. Cl.[7] ...................................................... H04K 9/00
[52] U.S. Cl. .............................. 380/45; 380/47; 380/257; 705/53; 705/54
[58] Field of Search .................................. 380/21, 45, 47, 380/257; 395/186; 705/53, 54; 713/150, 153

[56] References Cited

U.S. PATENT DOCUMENTS

| | | |
|---|---|---|
| 4,405,829 | 9/1983 | Rivest et al. . |
| 4,755,940 | 7/1988 | Brachtl et al. . |
| 5,313,521 | 5/1994 | Torii et al. ................................. 380/21 |
| 5,572,590 | 11/1996 | Chess . |
| 5,796,830 | 8/1998 | Johnson et al. ............................ 380/21 |
| 5,850,444 | 12/1998 | Rune ......................................... 380/21 |

OTHER PUBLICATIONS

"Applied Cryptography" Second Edition, Protocols, Algorithms and Source Code in C, by B. Schneier, 1996, pp. 466–471.

"Efficient Methods for Two Party Entity Authentication and Key Exchange in a High Speed Environment" by E. Basturk et al., IBM Technical Disclosure Bulletin, vol. 38, No. 03, Mar. 1995.

"Message Replay Prevention Using a Previously Transmitted Random Number To Sequence The Messages" by W. C. Martin, IBM Technical Disclosure Bulletin, vol. 27, No. 3, Aug. 1984.

"Personal Verification and Message Authentication Using Personal Keys" by R. E. Lennon et al., IBM Technical Disclosure Bulletin, vol. 24, No. 12, May 1982.

"SNA Bind Security Enhancement" by R. E. Lennon et al., IBM Technical Disclosure Bulletin, vol. 26, No. 10A, Mar. 1984.

"Transaction Incrementing Message Authentication Key" by W. D. Hopkins, IBM Technical Disclosure Bulletin, vol. 26, No. 1, Jun. 1983.

*Primary Examiner*—Thomas R. Peeso
*Assistant Examiner*—Todd Jack
*Attorney, Agent, or Firm*—William A. Kinnaman, Jr.

[57] ABSTRACT

Objects such as master keys or object protection keys that are kept in a protected environment of a crypto module are securely transferred between modules by means of transport keys. The transport keys are generated by public key procedures and are inaccessible outside the modules. Master keys are encrypted under the transport key within the protected environment of the source module, transmitted in encrypted form to the target module, and decrypted with the transport key within the protected environment of the target module. Object protection keys that are encrypted under a first master key kept in the protected environment of the source module are decrypted with the first master within the protected environment of the source module before being encrypted under the transport key. The object protection keys are encrypted under a second master key within the protected environment of the target module after being decrypted with the transport key. The procedure is secure since the transport key, the master keys and the object protection keys are never made available outside the protected environments of the crypto modules.

26 Claims, 24 Drawing Sheets

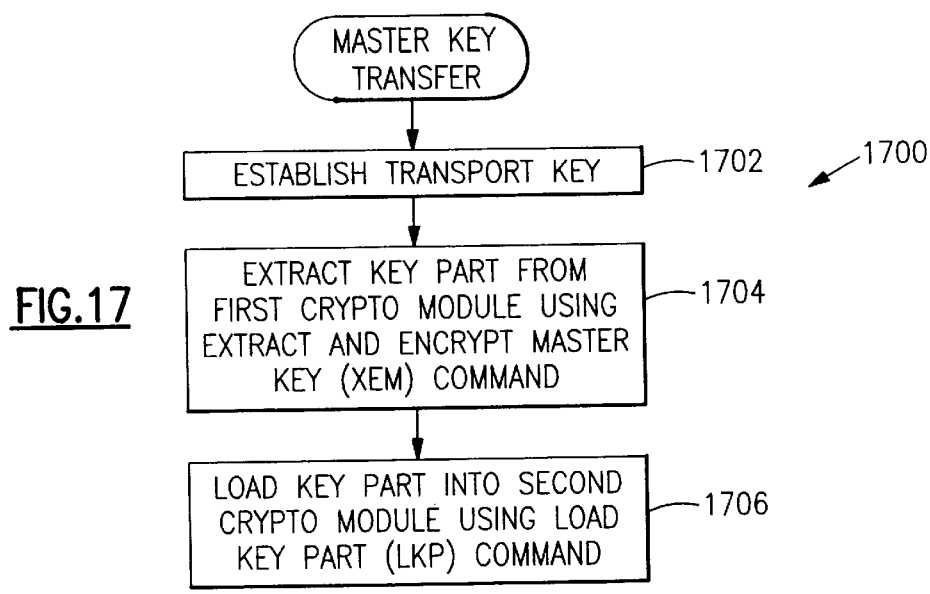
FIG. 17
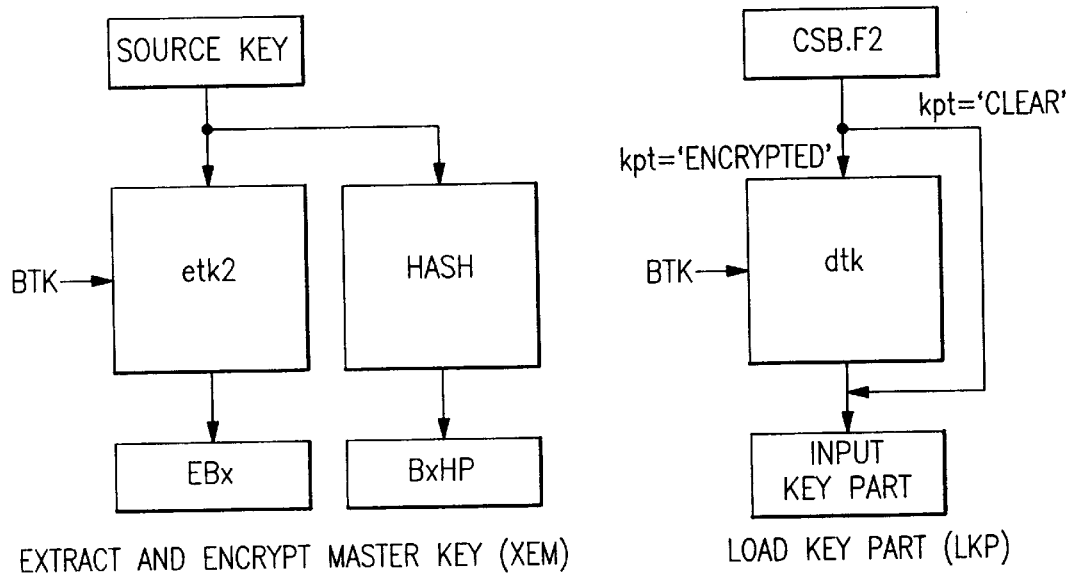
EXTRACT AND ENCRYPT MASTER KEY (XEM)
FIG. 18
LOAD KEY PART (LKP)
FIG. 19

| mkr | KEY TO BE EXTRACTED |
|---|---|
| 1 | MASTER KEY |
| 2 | AUX MASTER KEY |

S = etk2(c)

$C = dtk2(S)$

```
1BIT 0   8   16         32  40  48  56  63
BYTE
 0   |'00'|'03'| '00E8' |'79'| sx | dx |pmr|
```

| Byte | Field |
|---|---|
| 8 | CRYPTO MODULE ID (CMID) {16 BYTES} |
| 24 | TRANSACTION SN (TSN) {16 BYTES} |
| 40 | CSB.F1 hp OF PKA TRANSPORT KEY hp(PTK) {16 BYTES} |
| 56 | CSB.F2 ENCRYPTED OBJECT PROT. KEY e3*PMK(OPK) {48 BYTES} |
| 104–232 | HASH SIGNATURE {128 BYTES} |

<u>FIG.29</u>

```
1BIT 0   8   16         32  40  48  56  63
BYTE
 0   |'00'|'03'| '00E8' |'78'| sx | dx |pmr|
```

| Byte | Field |
|---|---|
| 8 | CRYPTO MODULE ID (CMID) {16 BYTES} |
| 24 | TRANSACTION SN (TSN) {16 BYTES} |
| 40 | CSB.F1 hp OF PKA TRANSPORT KEY hp(PTK) {16 BYTES} |
| 56 | CSB.F2 ENCRYPTED OBJECT PROT. KEY etk5(OPK) {48 BYTES} |
| 104–232 | HASH SIGNATURE {128 BYTES} |

<u>FIG.30</u>

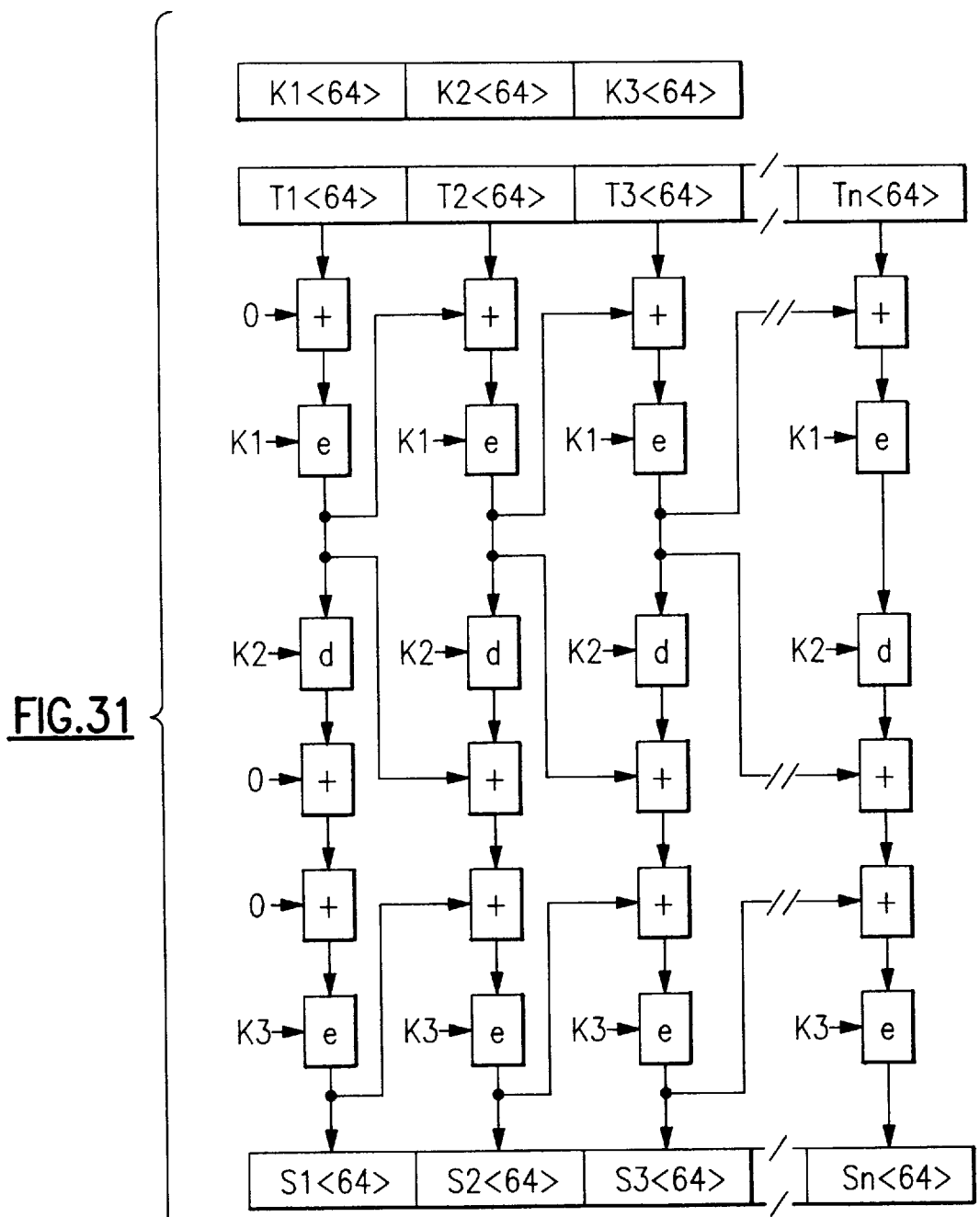

T = ded3(K,S)

S = etk5(C)
    OR
S = ede5(PTK,C)

S1 = etk5(T1)
S2 = +etk5(T2)
S3 = +etk5(T3)

| REGISTER | ABBR | COMMAND | | |
|---|---|---|---|---|
| | | LHM | LHG | CHK |
| DH MODULUS | DHm | L | – | – |
| DH GENERATOR | DHg | Rz | L | – |
| DH SECRET EXPONENT | DHx | Ri | L | – |
| DH FIRST KEY PART | DHf | Rz | L | – |
| BASIC TRANSPORT KEY | BTK | Ri | Ri | L |
| PKA TRANSPORT KEY | PTK | Ri | Ri | L |
| BASIC EXTRACTED KEY[1] | BX | Ri | Ri | Ri |
| PKA EXTRACTED KEY[1] | PX | Ri | Ri | Ri |
| BASIC EXTRACTED KEY HASH PATTERN | BXHP | Rz | Rz | Rz |
| PKA EXTRACTED KEY HASH PATTERN | PXHP | Rz | Rz | Rz |
| ENCRYPTED BASIC EXTRACTED KEY | EBX | Rz | Rz | Rz |
| ENCRYPTED PKA EXTRACTED KEY | EPX | Rz | Rz | Rz |
| PENDING-COMMAND REGISTER | PCR | Rz | Rz | Rz |

EXPLANATION:

[1] THE CLEAR EXTRACTED KEY IS USED ONLY AS AN INTERMEDIATE VALUE AND NEED NOT BE KEPT BETWEEN COMMAND EXECUTIONS. THE NAME, ABBREVIATION, SIZE, AND RESET REQUIREMENTS ARE SHOWN HERE ONLY FOR COMPLETENESS.

–   NO EFFECT ON THE REGISTER.
L   REGISTER IS LOADED AS PART OF THE OPERATION.
Ri  REGISTER IS RESET TO INVALID AS PART OF THE OPERATION.
Rz  REGISTER IS RESET TO ZERO AS PART OF THE OPERATION.
LHM  LOAD DH MODULUS
LHG  LOAD G AND GENERATE DH FIRST PART
CHK  COMBINE DH KEY PARTS

```
BIT 0    8   16      32  40  48  56  63
BYTE
 0  |'00'|'03'|'0128'|'32'| sx |'00'|'00'|
 8  |   CRYPTO MODULE ID (CMID)         |
    |         {16 BYTES}                |
24  |   TRANSACTION SN (TSN)            |
    |         {16 BYTES}                |
40  | CSB  DH MODULUS (DHm)             |
    |         {128 BYTES}               |
168 |      HASH SIGNATURE               |
    |         {128 BYTES}               |
296
```

FIG.37

```
BIT 0    8   16      32  40  48  56  63
BYTE
 0  |'00'|'03'|'0128'|'33'| sx |'00'|'00'|
 8  |   CRYPTO MODULE ID (CMID)         |
    |         {16 BYTES}                |
24  |   TRANSACTION SN (TSN)            |
    |         {16 BYTES}                |
40  | CSB  DH GENERATOR (DHg)           |
    |         {128 BYTES}               |
168 |      HASH SIGNATURE               |
    |         {128 BYTES}               |
296
```

FIG.38

```
BIT 0    8   16      32  40  48  56  63
BYTE
 0  |'00'|'03'|'0128'|'34'| sx |'00'|'00'|
 8  |   CRYPTO MODULE ID (CMID)         |
    |         {16 BYTES}                |
24  |   TRANSACTION SN (TSN)            |
    |         {16 BYTES}                |
40  | CSB  DH SECOND KEY PART           |
    |   ($g^Y$ MOD p){128 BYTES}        |
168 |      HASH SIGNATURE               |
    |         {128 BYTES}               |
296
```

METHOD AND APPARATUS FOR THE SECURE TRANSFER OF OBJECTS BETWEEN CRYPTOGRAPHIC PROCESSORS

CROSS-REFERENCE TO RELATED APPLICATIONS

This application is related to the following commonly owned, concurrently filed applications, incorporated herein by reference:

R. M. Smith, Sr. et al., "Method and Apparatus for Providing Public Key Security Control for a Cryptographic Processor", Ser. No. 08/884,724;

R. M. Smith, Sr. et al., "Method and Apparatus for Controlling the Configuration of a Cryptographic Processor", Ser. No. 08/884,721.

BACKGROUND OF THE INVENTION

1. Field of the Invention

This invention relates to a method and apparatus for securely transferring objects between crypto modules and, more particularly, to a method and apparatus for transferring such objects as master keys and object protection keys between cryptographic coprocessors of general-purpose computers.

2. Description of the Related Art

Cryptographic functions of a general-purpose computer such as data encryption, digital signature processing and key management have often been performed by a cryptographic coprocessor, both for performance reasons and because of the special security problems posed by the cryptographic environment. One example of a cryptographic coprocessor in an IBM S/390 environment is the Integrated Cryptographic Facility (ICRF). ICRF was used with processors employing bipolar technology. With the migration to CMOS processor technology, as exemplified by the S/390 Parallel Enterprise Server, new technological challenges have arisen in the design of a cryptographic coprocessor that is optimized for a CMOS setting.

In an environment where reliability, availability, and serviceability are important, it is necessary to provide for multiple parallel systems which can be used to assist in throughput, backup, and recovery. For most types of equipment, this can be accomplished by providing several units, all of which are interchangeable. With cryptography, this presents a problem, since some of the information in a particular cryptographic processor (e.g., a cryptographic coprocessor of a general-purpose computer) must be kept secret. This is true, in particular, for master keys. Many customer environments require the master keys for all production systems to be the same.

In most cases, master keys are derived from information from several sources. For installation of a new system it will usually be possible to arrange for all parties having the component parts to be available to enter the particular parts. But for installation of a replacement cryptographic processor this may not be the case. In these cases, it is desirable to have a way to transfer the master key from one cryptographic processor to another.

In some cases, the master key information could be the result of random, or pseudorandom, information and is not known to anyone outside of the system. In these cases, it is necessary to have a way to transfer the master key from one cryptographic processor to another.

When PKA (public key algorithm) private keys are used by a cryptographic processor, the private key is protected in the form of an encapsulated object. There may be situations in which the same private key needs to be available to multiple systems. This could be the case for purposes of performance or availability. The problem is, how to provide a hardware-controlled mechanism to permit a secure transfer of an encapsulated object from one system to another.

The following methods have been provided in the past:
1. The systems share the same cryptographic processor.
2. The systems share a common master key.
3. The private key is protected by an object protection key and the object protection key is shared by the systems.
4. The private key is converted to an external form, encrypted under a shared key, transmitted from one system to the other, and then converted from the external form to an internal form.

The first alternative listed above does not provide availability or performance. The first two alternatives provide no granularity of sharing; the two systems either share everything or nothing. In many cases, it will be required that some, but not all, private keys need to be available on two systems. Alternatives 2–4 require a preestablished shared secret before this secret can be shared. Alternatives 3 and 4 have never been provided in the past with multiple control.

A cryptographic processor must provide for the secure entry of key parts for the master key and also for operational keys. One possible approach is to use an RSA key on the cryptographic processor for both authentication and protection of secret information sent to the cryptographic processor. However, the RSA secret exponent may be burned into the cryptographic processor and not erased if the cryptographic processor is removed from the system. Thus, if after the cryptographic processor has been used for some time, it fails, is sold or is stolen, it is possible that the cryptographic processor chip can be opened and inspected to reveal the RSA secret exponent. Knowledge of this RSA secret exponent could then be used to decrypt any secret information previously encrypted using the public key of the cryptographic processor.

The use of the Diffie-Hellman (DH) key agreement procedure to establish a shared secret is well known in the art, and software-only versions abound. But splitting this function up between hardware functions inside a secure boundary and a software program which resides outside of this boundary is a nontrivial problem.

SUMMARY OF THE INVENTION

In accordance with one aspect of the present invention, a new function, master key transfer, is provided. Master key transfer permits a master key to be transferred from one crypto module to another crypto module without having to reenter the original master key parts. This reduces the manual overhead associated with loading multiple crypto modules with the same master key at initialization time, and also provides for more rapid recovery after tampering or when a new crypto module is installed after initialization.

Master key transfer is accomplished by using a key agreement procedure such as the Diffie-Hellman (DH) key exchange protocol to establish a common transport key between the two crypto modules involved. Commands are provided to extract the old, current, and new master key of any domain and encrypt the extracted key under the transport key. At the receiving crypto module, the extracted key can be treated as the initial key part and an all-zero key part can then be used as the final key part. These parts can then be installed on the receiving crypto module using the current master key installation functions. Special controls may be provided as part of a key part queue to permit a single key part entry to be used as both the initial key part and final zero part.

In addition to the above, commands may be provided to perform master key transfer on the receive object master key (RMK) and signature object master key (SMK) for each domain. Commands may also be provided to permit the extracted master key to be directly placed in the target master key registers without using the current master key installation functions.

Since the extraction function is performed using PKSC and the master key installation is performed using the current ICRF functions, master key transfer has no effect on the ICRF interface.

The transport key can be set up by a single authority. But other authorities can verify that the authority setting up the transport key has done this properly. The authorities can also verify that the transport key being used is not known by anyone outside of the cryptographic processor, and, in particular, that the authority setting up the transport key does not have a copy of the transport key in the clear which could be used to decipher the encrypted master key. Thus, master key transfer in accordance with the present invention provides a process which is completely secure, but at the same time is publicly auditable.

Four public key cecurity control (PKSC) commands have been included in the cryptographic processor to provide for multiple-controlled export from one system and multiple controlled import to another:

1. Reencipher From SMK
2. Reencipher From RMK
3. Reencipher To SMK
4. Reencipher To RMK The first two functions in the list are used to export the object, the last two are used to import it in another system. The same basic mechanism (i.e., the Diffie-Hellman key exchange protocol) is used to establish a common transport key as used in the master key transfer scenario. Since the functions operate under the control of a separate entry in the signature requirement array, these functions can be very tightly controlled, and can be crippled in systems in which the customer does not wish to use the function.

This solution provides for multiple copies, improving availability and performance, granularity, and hardware-enforced multiple control. As with master key transfer, encapsulated object transfer as implemented on the cryptographic processor provides a process which is completely secure, but at the same time is publicly auditable.

RSA is used only for authentication, Diffie Hellman (DH) is used for key exchange.

All parameters used to set up the transport key can be queried by all authorities. Thus, it is possible to determine that the DH modulus and the DH generator are approved values. In the case of master key transfer, the hash pattern of the transport key in each system can be queried. If these match in the two systems, then, because of the algorithms used, it is known that the transport key does not exist outside of these two cryptographic processors.

Atomicity of transport information is guaranteed by resetting the PCR, the transport key, and encrypted key registers when the functions which change transport information are executed. Thus, if the program queries the PCR first and last, and it has not changed, it is assured that the transport information has not changed.

The DH key transfer mechanism implemented on the cryptographic processor provides a process which is completely secure, but at the same time is publicly auditable.

The transport key can be set up by a single authority. But other authorities can verify that the authority setting up the transport key has done this properly.

BRIEF DESCRIPTION OF THE DRAWINGS

FIG. 6 shows the signature requirement array (SRA).

FIG. 17 shows the general procedure for transferring a key part from one crypto module to another.

FIG. 18 shows the data transformations performed by the Extract and Encrypt Master Key (XEM) command.

FIG. 19 shows the data transformations performed by the Load Key Part (LKP) command.

FIG. 29 shows the format of the Reencipher From SMK (RFS) and Reencipher From RMK (RFR) commands.

FIG. 30 shows the format of the Reencipher To SMK (RTS) and Reencipher To RMK (RTR) commands.

FIG. 31 shows the ede3 encryption algorithm used by the RTS and RTR commands.

FIG. 35 shows the effect of the Load DH Modulus (LHM) command, the Load G and Generate DH First Part (LHG) command, and the Combine DH Key Parts (CHK) command on the transport registers and pending command register (PCR).

FIG. 36 shows the format of the Load DH Modulus (LHM) command.

FIG. 37 shows the format of the Load G and Generate DH First Part (LHG) command.

FIG. 38 shows the format of the Combine DH Key Parts (CHK) command.

DESCRIPTION OF THE PREFERRED EMBODIMENTS

Public Key Security Control (PKSC) Overview

Figure 1:
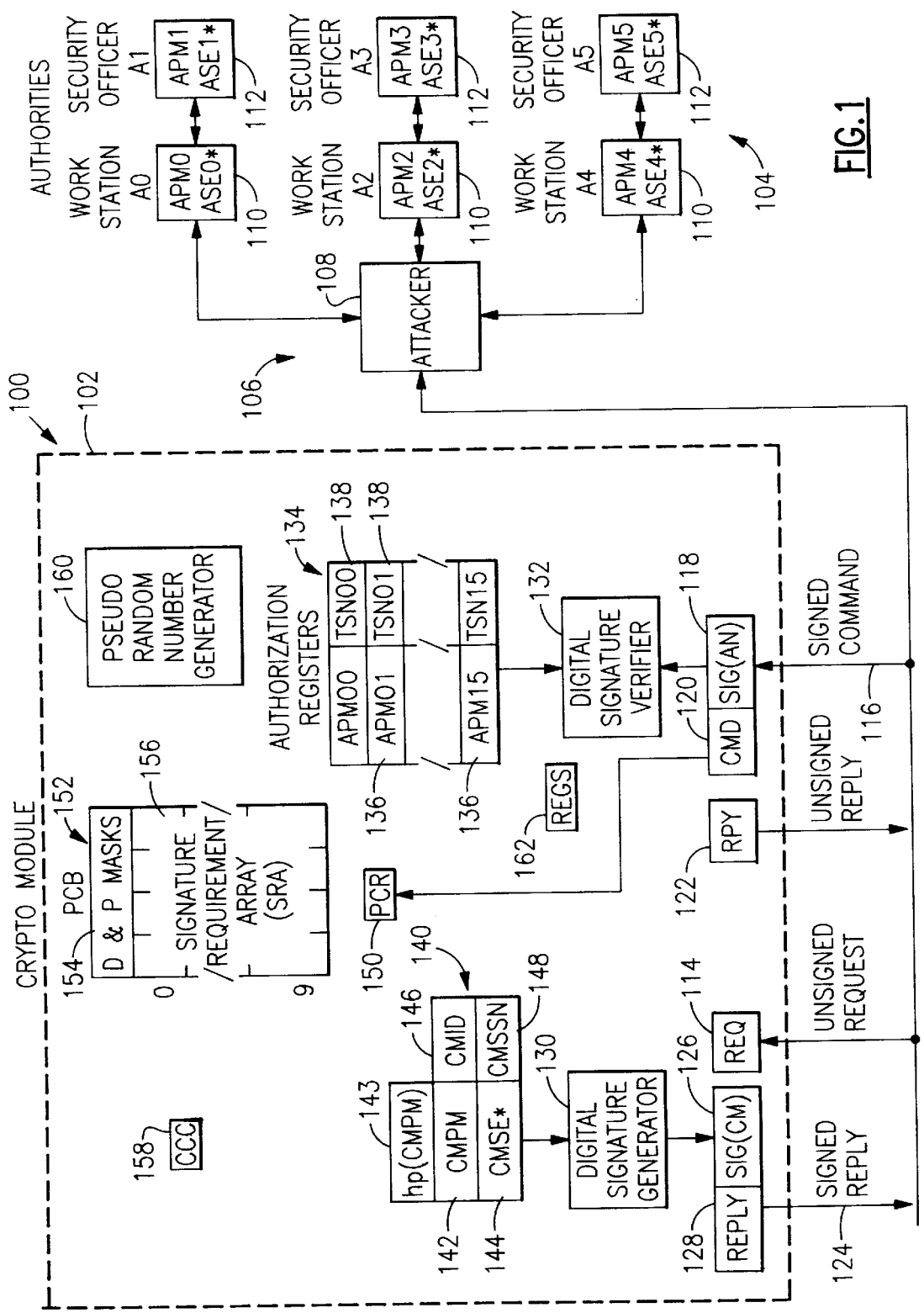
FIG. 1 is a schematic block diagram of an information handling system incorporating the present invention.

FIG. 1 is a schematic block diagram of an information handling system 100 incorporating the present invention. As shown in FIG. 1, in system 100 a crypto module 102 is coupled to one or more authorities 104 (A0–A5) via a network 106 to which an attacker 108 is presumed to have access. Crypto module 102 may be either a standalone unit or physically integrated into a central processor complex (CPC) (not separately shown) of a general-purpose digital computer. Authorities 104 may comprise either workstations 110 (A0, A2, A4) or security officers 112 (A1, A3, A5).

The internal elements of the crypto module 102, described in more detail below and in the related applications referred to above, will now be briefly described. The following table provides an explanation of various terms used in FIG. 1:

| | |
|---|---|
| * | Information is secret |
| APMn | Public Modulus for Authority n |
| ASEn* | Secret Exponent for Authority n |
| CCC | Crypto Configuration Control |
| CMID | Crypto Module ID |
| CMPM | Crypto Module Public Modulus |
| CMSE* | Crypto Module Secret Exponent |
| CMSSN | Crypto Module Signature Sequence Number |
| PCB | PKSC Control Block |
| PCR | Pending Command Register |

A particular authority n (An) 104 interacts with the crypto module 102 by way of either an unsigned request (Req) or query 114 or a signed command 116 having a digital signature 118 (Sig(An)) of the authority n appended to a signed portion 120 (Cmd). The crypto module 102 responds to a signed command 116 or an unsigned query 114 with a signed reply (Reply) 124 having a signature (Sig(CM)) 126 appended to a signed portion 128. When a request command cannot be performed because of error or other abnormal conditions, the crypto module 102 responds to the request command 116 or 114 with an unsigned reply (Rpy) 122.

Figure 2:
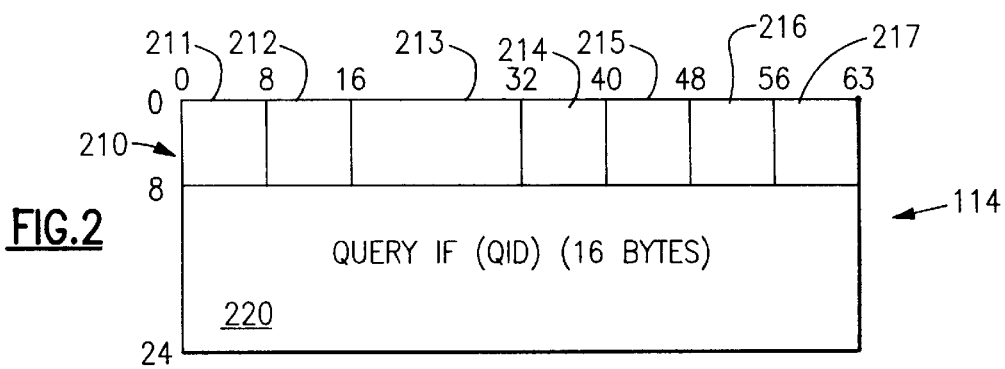
FIG. 2 shows the format of a typical query.

FIG. 2 shows the format of a typical query 114, which in the disclosed embodiment has a total length of 24 bytes (192 bits). Query 114 contains an 8-byte (64-bit) header 210 made up of various fields 211–217, followed by a 16-byte (128-bit) query identifier (QID) 220 that is generated randomly by the originating authority 104.

Figure 3:
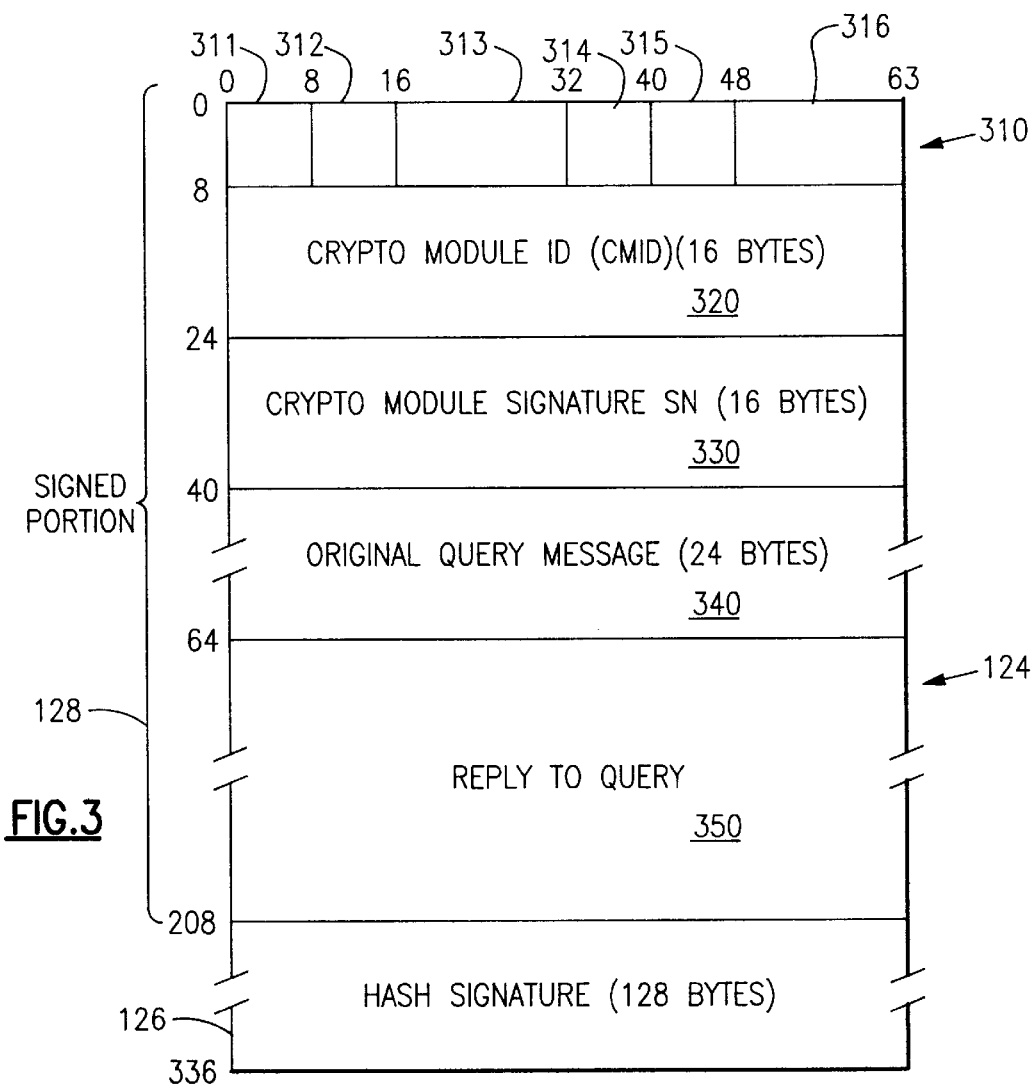
FIG. 3 shows the format of a typical reply to a query.

FIG. 3 shows the format of a typical reply 124 to a query 114, which in the disclosed embodiment has a total length of 42 bytes (336 bits) consisting of a 26-byte (208-bit) signed portion 128 and a 128-byte (1024-bit) digital signature 126. Signed portion 128 contains an 8-byte (64-bit) header 310 made up of various fields 311–316, followed by a 16-byte (128-bit) crypto identifier (CMID) 320, a 16-byte (128-bit) crypto module signature sequence number (SMSSN) 330, a 24-byte (192-bit) copy 340 of the original query message 114 and, finally, a 144-byte reply proper 350.

Figure 4:
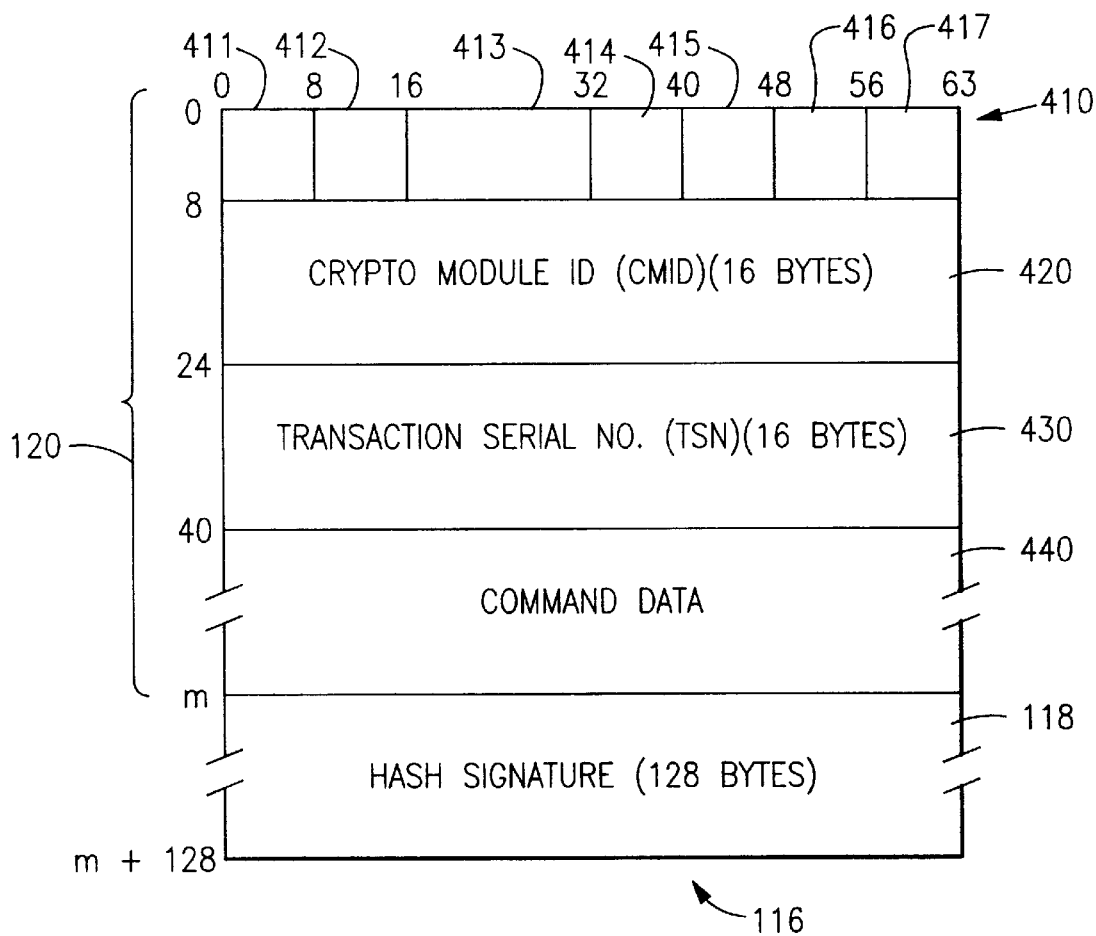
FIG. 4 shows the format of a typical signed command.

FIG. 4 shows the format of a typical command 116. Signed portion 120 contains an 8-byte (64-bit) header 410 made up of various fields 411–417, followed by a 16-byte (128-bit) crypto identifier (CMID) 420, a 16-byte (128-bit) transaction sequence number (TSN) 430 (in commands requiring a signature of the issuing authority 104), and a variable-length portion 440 containing command data, the nature of which varies with the command. Following the signed portion 120 is a 128-byte (1024-bit) hash signature 118. In the disclosed embodiment, header fields 411 and 412 contain the respective hexadecimal values '00' and '03' for all commands, while the content of fields 413–417 varies with the command.

A digital signature generator 130 is used to generate the digital signature 126 appended to a reply 128, while a digital signature verifier 132 is used to verify a signature 118 received from an authority 104.

A set of authorization registers 134 store authorization information, including a public modulus (APMn) 136 and a transaction sequence number (TSNn) 138, for each authority n for up to 16 different authorities 104 in the embodiment shown. The public modulus 136 is used by digital signature verifier 132 to verify a digital signature 118 received from an authority 104. The transaction sequence number 138 is used to compare with the sequence number 430 in the command 116 received from an authority 104, as described below.

Crypto module 102 also has a set of registers 140 for storing various crypto module information, including a crypto module public modulus (CMPM) 142, a crypto module secret exponent (CMSE) 144, a crypto module identifier (CMID) 146, and a crypto module signature sequence number (CMSSN) 148. CMPM 142 and CMSE 144 are used by digital signature generator 130 to generate the digital signatures 126 appended to replies 128 to queries 114 or commands 116. CMID 146 and CMSSN 148 are used for purposes to be described below. In a similar manner, each authority 104 also stores a public modulus APM and a secret exponent ASE that it uses to generate a digital signature.

A pending command register (PCR) 150 is used to track the progress of commands requiring multiple signatures, as described below.

A PKSC control block (PCB) 152 contains a set of masks 154 specifying various authorizations for the authorities 104 and the like, followed by a signature requirement array (SRA) 156 specifying signature requirements for each of a plurality of command types.

In addition to the storage areas described above, crypto module 102 contains a crypto configuration control (CCC) 158, a storage area containing various fields for specifying the operation of the crypto module.

Finally, crypto module 102 contains a pseudorandom number generator (PRNG) 160 for generating in a cryptographically secure manner the various random numbers used in the cryptographic procedures performed by the crypto module. PRNG 160 is described in the following copending applications of R. S. DeBellis et al., filed May 15, 1997, and incorporated herein by reference:

"Pseudorandom Number Generator", Ser. No. 08/856,562;

"Pseudorandom Number Generator with Backup and Restoration Capability", Ser. No. 08/856,882;

"Pseudorandom Number Generator with Normal and Test Modes of Operation", Ser. No. 08/856,828;

In addition to the registers already described, crypto module 102 also contains various master key registers and transport registers, indicated collectively as REGS 162 in FIG. 1 and illustrated more fully in FIG. 16 below.

Security Assumptions

As already stated, FIG. 1 shows an attacker 108 in the network 106 between the authorities 104 and the crypto module 102. This is to indicate the types of attacks which the disclosed public key security control is designed to prevent. It is assumed that information in the crypto module 102, in the workstations 110, and associated with security officers 112 is secure, but all information to and from the crypto module may be monitored, altered, rerouted, or discarded by the attacker 108 and that additional messages may be inserted into the network 106 by the attacker 108.

It should be noted, however, that an attacker 108, to be successful, must be subtle. Thus, for example, if an attacker 108 were to simply refuse to transmit any messages, such an action would make it immediately obvious to all in the network 106 that the network is broken and the attacker would be discovered and removed.

Types of Authorities

In FIG. 1, both workstations 110 and security officers 112 are shown as authorities 104. This is to indicate that the secret key used to sign a message from an authority 104 may be associated either with the workstation 110 or with the security officer 112. The secret key associated with a workstation 110 remains with the workstation. In the case of a secret key associated with a security officer 112, the key may be carried on a security card and then read into the workstation 110, but when the security officer 112 leaves, the key is erased from that workstation 110. Thus, the secret key moves with the security officer 112 from one workstation 110 to another.

PKSC Security

Security provided by the PKSC consists of separate mechanisms to provide integrity and secrecy. At initialization time, security is built up in stages, first integrity of the crypto module 102, then integrity of the authorities 104, and finally these integrity mechanisms are used as part of the process to establish secrecy.

Initial State

The crypto module 102 receives power from two sources: regular power and battery back up. If power from both sources is removed, all volatile storage in the crypto module 102 is erased. This is called crypto module reset. Crypto module reset is also performed by the Initialize Crypto Module (ICM) PKSC command.

After crypto module reset, the crypto module 102 is available on a first-come-first-served basis, that is, anyone, including an attacker 108, can take control of the crypto module 102. However, since no secret information is shared during the first parts of initialization, there is no exposure to loss of security during this part of the process.

At each step of the initialization process, each of the authorities 104 can examine the state of the crypto module 102 and ensure that control has been properly established and that only the proper authorities have been given control. Thus, if an attacker 108 takes control during this process, the rightful authorities 104 soon become aware of this and refuse to cooperate and do not provide any of the essential information necessary to use the crypto module 102 in a useful application.

PKSC Integrity

Most of the communication between crypto module 102 and the authorities 104 is not secret, but does require integrity. Integrity of communication is ensured by means of public key digital signatures.

Public key cryptography as used for data privacy, digital signatures and the like is well known in the art. Whereas conventional (or symmetric) cryptography such as the Data Encryption Standard (DES) uses the same secret key for both encryption and decryption, public key (or asymmetric) cryptography uses separate keys for encryption and decryption. A person wishing to receive a message generates a key pair in such a manner that the decryption key cannot be feasibly derived from the corresponding encryption key of the pair. The person then makes the encryption key public while keeping the decryption key secret. Anyone having access to the public encryption key can encrypt a message to the receiver. However, only the receiver can decrypt the message, since only he possesses the decryption key and no other person can feasibly derive the decryption key merely from knowledge of the public encryption key.

Perhaps the best known example of public key encryption is RSA encryption, named after its originators Rivest, Shamir, and Adleman. RSA is described in B. Schneier, *Applied Cryptography*, 1996, pp. 466–471, and in U.S. Pat. No. 4,405,829, both incorporated herein by reference. In RSA encryption, a person wishing to receive an encrypted message generates a public modulus n, a private exponent d and a public exponent e. The public modulus n and the public exponent e together constitute the public key. A sender transforms a plaintext message m into a ciphertext block c by performing the modular exponentiation operation $c = m^e \bmod n$, while similarly the receiver decrypts the ciphertext block c to recover the plaintext message m by performing the inverse operation $m = c^d \bmod n$.

Although public key encryption is more computationally intensive than conventional encryption, it has the singular advantage that it does not require the secret transmission of a key. All that is required is that the public encryption key be communicated to potential users with integrity, so that the users are assured that the public key actually originates from the recipient and has not been altered.

Similar public key techniques may be used for digital signature generation and verification. Here too, a public/private key pair is generated. The private key is used to encrypt a hash or digest of the original message to generate a message signature. The public key is used to verify the signature by generating a similar hash of the message, decrypting the received signature, and comparing the two results. Only the possessor of the private signature key can sign a message, whereas anyone having access to the public key can verify the message signature.

Although the RSA public key cryptosystem is used in the disclosed embodiment, the invention is not limited to this particular public key cryptosystem, and other cryptosystems may be used.

Thus, while references to keys herein are to RSA keys, the invention is not so limited.

Messages requiring integrity from the crypto module 102 to the authorities 104 are signed by the crypto module using its own secret key (CMSE) 144 and verified by the authority using the crypto module public key. Similarly, messages requiring integrity from an authority 104 to the crypto module 102 are signed by the authority using its own secret key (ASE) and verified by the crypto module using the public key of the authority.

To ensure the integrity of this communication, it is necessary to install the public key of the sender in the receiver with integrity.

Crypto Module Key Generation

During the manufacturing process, a unique 128-bit crypto module ID (CMID) 146 and a unique 1024-bit RSA key is generated for each crypto module 102. As described above, an RSA key consists of a public modulus, a public exponent, and a private exponent. The public exponent for all PKSC RSA keys is a fixed value of 65,537 ($2^{16}+1$). The public modulus part of this RSA key is called the crypto module public modulus (CMPM). The CMID, the crypto module secret exponent (CMSE), and the hash pattern hp(CMPM) of the crypto module public modulus CMPM are placed in nonvolatile storage 140 in the crypto module 102. CMPM 142 is 128 bytes in length and can be queried by means of a Query Module Information (QMI) PKSC query command 114 to be described; the corresponding hash pattern hp(CMPM) is stored at 143. CMSE 144, which is kept secret, is placed within shielding to prevent discovery of the value without destruction of the chip.

During the manufacturing process, CMSE 144 is used to sign four PKSC commands 116: an Initialize Crypto Module (ICM) command which loads CMPM 142 and sets the CCC 158 to disable all functions except for the initialization commands, and three Load Initialization Modulus (LIM) commands which load the public modulus APM of three different initialization authorities 104. Depending on the manufacturing process, additional ICM commands 116 which set up some of the most common configurations may also be signed. After CMSE 144 is placed in the crypto module 102, and all of these self-signature initialization commands 116 have been signed, the CMSE value is erased and no record of this information (outside of the tamper-proof area 144) is kept.

CMID 146 and the signatures of the four commands are kept in a special database called the crypto module certification center database. If additional signatures were generated, then this information is also placed in the database, but these signatures must be kept secret.

Crypto Module Certification Center

To provide integrity, it is necessary for each of the authorities 104 to verify that they are communicating with the intended crypto module 102 and not being routed to an incorrect or fictitious crypto module simulated by an attacker 108.

Authentication of the crypto module 102 is done by means of a Crypto Module Certification Center provided by a suitable certification authority, such as the manufacturer of the crypto module 102. The certification center maintains a list of all crypto modules 102 produced by the manufacturer and the current status of each. Status includes the public modulus 142 (CMPM) of the crypto module 102, the signatures 118 of the four self-signed initialization commands 116, and other information such as where the crypto module is installed and whether it has been replaced, or reported missing or stolen.

During the initialization process, the authority 104 begins by querying the crypto module 102 using the Query Module Information (QMI) PKSC command 114. Since the crypto module 102 has not yet been initialized, the response is not signed, 124 but it does contain the crypto module ID (CMID) 146.

Figure 12:
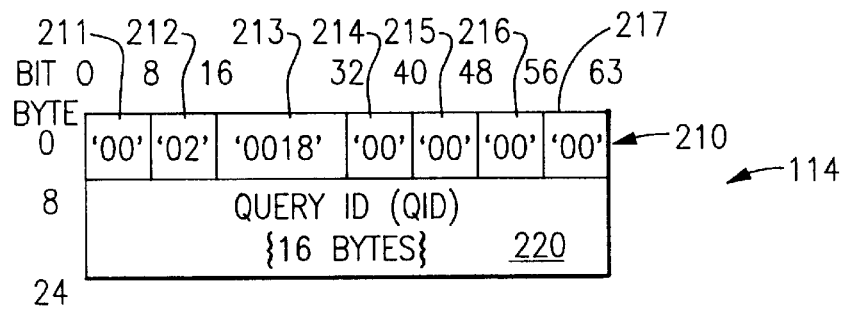
FIG. 12 shows the format of a Query Module Information (QMI) query.
Figure 13:
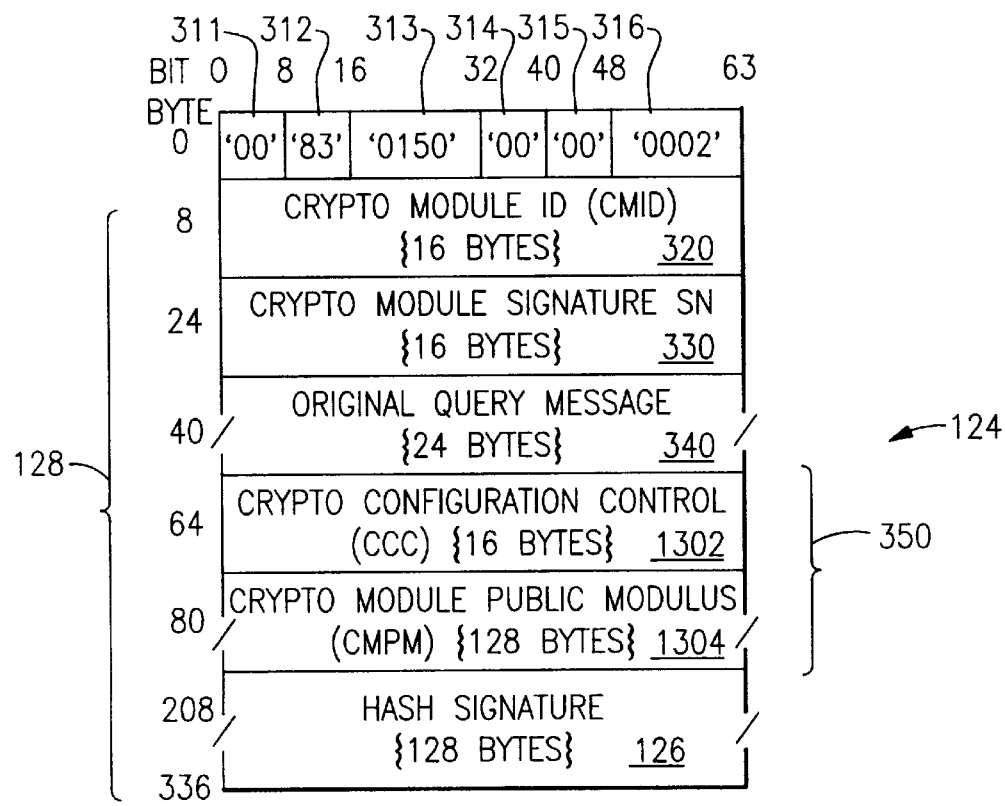
FIG. 13 shows the format of a reply to a QMI query.

FIG. 12 shows the format of a Query Module Information (QMI) query 114, while FIG. 13 shows the format of a reply 124 to a QMI query. In the query header 210, the field 214 ('00') identifies the query 114 as being a QMI query. In the reply 124, the return data 350 comprises a copy 1302 (16 bytes in length) of the crypto configuration control (CCC) information 158, followed by a copy 1304 of the crypto module public modulus (CMPM) 142 (128 bytes in length).

The authority 104 then calls the certification center, perhaps by means of an 800 number, and requests information concerning this particular crypto module ID. The certification center then checks its database to verify the status of the crypto module 102 identified.

Depending on the configuration to which the end user is entitled, and, in some cases, depending on positive identification of the authority 104, the certification center may send the authority 104 a single Initialize Crypto Module (ICM) PKSC command which establishes the CMPM and also the final values for the crypto configuration control, or the certification center may send signatures for the ICM command and two of the three Load Initialization Public Modulus (LIM) commands. When multiple initialization commands are required, the crypto module certification center must communicate with the crypto module 102 in an interactive manner to set up the desired configuration.

At the completion of the initialization process, the authority 104 issues the Query Module Information (QMI) command. If the certification center has given an acceptable report for this particular crypto module 102, if the initialization commands have been accepted, and if the response to the QMI verifies using the public key of the crypto module, then the authority 104 can be assured that communication is to the desired crypto module and not an alternate or a fictitious one.

Establishing Integrity of the Authorities

After the initialization process is complete, a command from an authority 104 to the crypto module 102 is performed by the crypto module only if the crypto module can verify the integrity of the command, that is, that the command came from a source authorized to control this crypto module 102. This is accomplished by installing the public keys of the authorities 104 in the crypto module 102.

PKSC Commands

Commands from authorities 104 to the crypto module 102 may be either unsigned requests or queries 114 or signed commands 116. Signed commands are of five types: single-signature, multiple-signature, cosignature, self-signature initialization, and two-signature initialization.

All information in the crypto module 102 except that specifically marked as secret can be obtained by means of queries 114. In the case of most secret information, the hash pattern of the secret information is provided. Queries 114 are unsigned and are sent from the authority 104 to the crypto module 102. Included in the query 114 is a 16-byte query ID (QID) field 220 (FIG. 2), which is a random number generated by the workstation 110 and used only once. The reply 124 to a query 114 is signed by the crypto module 102 and contains, as part of its copy 340 of the original query 114, the QID 220 from that query. The use of the QID eliminates the possibility of replay by an attacker 108. Thus, the authority 104 is assured of up-to-date information.

Single-signature commands 116 are used to operate on information in the crypto module 102 which does not need to be authenticated by multiple authorities 104. When the PKSC signature verification control (CCC bit 7) is zero, single-signature commands 116 are accepted without verification. When the PKSC signature verification control (CCC bit 7) is one, single-signature commands 116 are accepted if signed by any of the authorities 104 listed in the authority registers 134.

Multiple-signature commands 116 are not executed directly, but are placed in the pending command register (PCR) 150 and held pending until sufficient cosignatures 118 have been received to meet the requirements for that particular type of command. The signature requirement array (SRA) 156 contains the requirements for each type of multiple-signature command.

When a multiple-signature command 116 is placed in the PCR 150, a 16-byte value (PCID) is generated and placed in the PCR. This permits each authority 104 to query the appropriate fields in the crypto module 102 before cosigning the pending command 116. If, during this time, any of the authorities 104 were to change the pending command, a new PCID would be generated and the Cosign command intended to cosign one command could not be misused to sign a different one.

Crypto Module ID (CMID)

During the manufacturing process, a unique 128-bit value is generated for each crypto module 102. This, value, called the crypto module ID (CMID), is 16 bytes in length and is returned in all PKSC reply messages sent by the crypto module 102.

PKSC Control Block (PCB)

Figure 5:
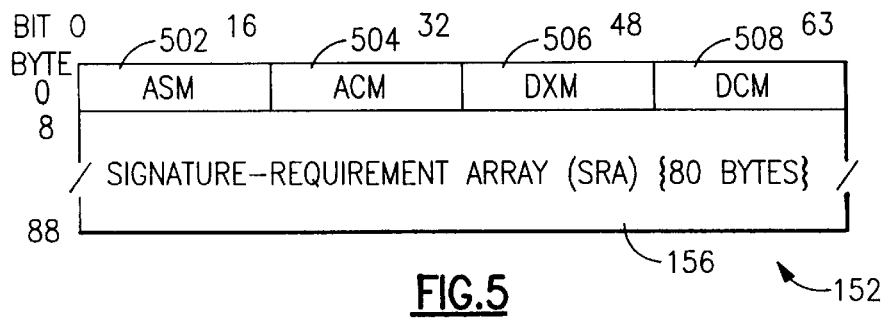
FIG. 5 shows the PKSC control block (PCB).

PKSC control block (PCB) 152 contains the primary controls for controlling and restricting the PKSC commands 116. FIG. 5 shows the PKSC control block 152, which consists of four mask fields 502, 504, 506, 508 and the signature requirement array (SRA) 156. The PCB 152 can be queried by means of the Query Control Block (QCB) PKSC query 114 and can be loaded by means of the Load Control Block (LCB) PKSC command 116. The PCB 152 is 80 bytes in length and is set to all zeros by crypto module reset.

Signature Requirement Array (SRA)

Signature requirement array (SRA) 156 is provided to accommodate different user environments and requirements and may be set during initialization to indicate which authorities 104 are permitted to execute or cosign a particular multiple-signature command 116.

Figure 7:
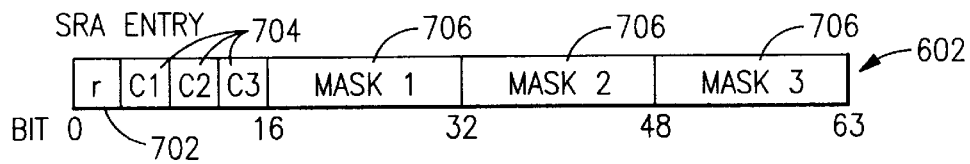
FIG. 7 shows a particular entry in the signature requirement array (SRA).

Referring to FIGS. 6–7, SRA 156 contains an entry 602 for each of ten different multiple-signature commands 116 in the disclosed embodiment. Each entry 602 indicates which authorities 104 are eligible to execute, or cosign, and how many signatures 118 are required to meet the requirement. A pending command 116 is not executed until all the requirements for that command have been met.

Thus, for example, SRA 156 can be set up to permit any two out of three security officers 112 to issue a Load Environment Control Mask (LEC) command 116 from any workstation 110. The SRA entry 602 for a Load PKSC Control Block (LCB) command 116, on the other hand, might be set up to require a different set of security officers 112 and require signatures 118 from both security officers and work stations 110.

In the disclosed embodiment, the signature requirement array (SRA) 156 contains ten 8-byte entries 602, one for each of the ten multiple-signature commands 116. Each SRA entry 602 contains three signature requirement specifications. FIGS. 6–7 show the signature requirement array 156 and a signature requirement array entry 602.

Each signature requirement specification consists of a 4-bit count 704 and a 16-bit mask 706. The 16-bit mask 706 indicates which authority signatures 118 are eligible to be counted for that requirement and the count 704 indicates how many signatures are required to meet the requirement. If the count 704 is zero, then the requirement is considered to be satisfied and the mask 706 is ignored. In the present embodiment, bits 0–3 (r) of the signature requirement array entry 602 make up a reserved field 702; the bits are not examined by the machine, but should be set to zero. Bits 4–7 (C1), 8–11 (C2), and 12–15 (C3) of the signature requirement array entry 602 are the first, second, and third counts 704, respectively. Bits 16–31, 32–47, and 48–63 of the signature requirement array entry 602 are the first, second, and third masks 706, respectively.

Pending Command Register (PCR)

Figure 8:
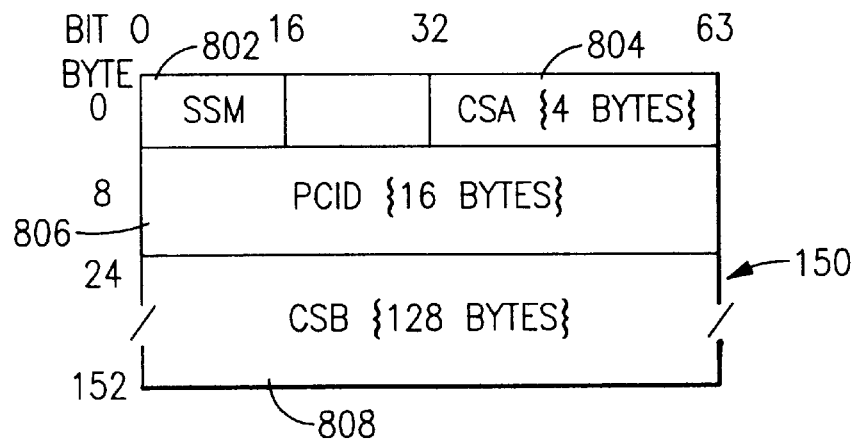
FIG. 8 shows the pending command register (PCR).

A PKSC command 116 which requires multiple signatures 118 is placed in the pending command register 150 while the multiple signatures are being processed. Queries 114 and cosign commands 116 can be performed while a command is held in the PCR 150. All single-signature and self-signature initialization commands 116, however, cause the PCR 150 to be cleared. FIG. 8 shows the pending command register 150.

Bits 0–15 of the PCR 150 are a signature summary mask (SSM) 802. These bits correspond to authorities 104 (A0–A15) and indicate which authorities have signed (or cosigned) the pending command 116.

Figure 10:
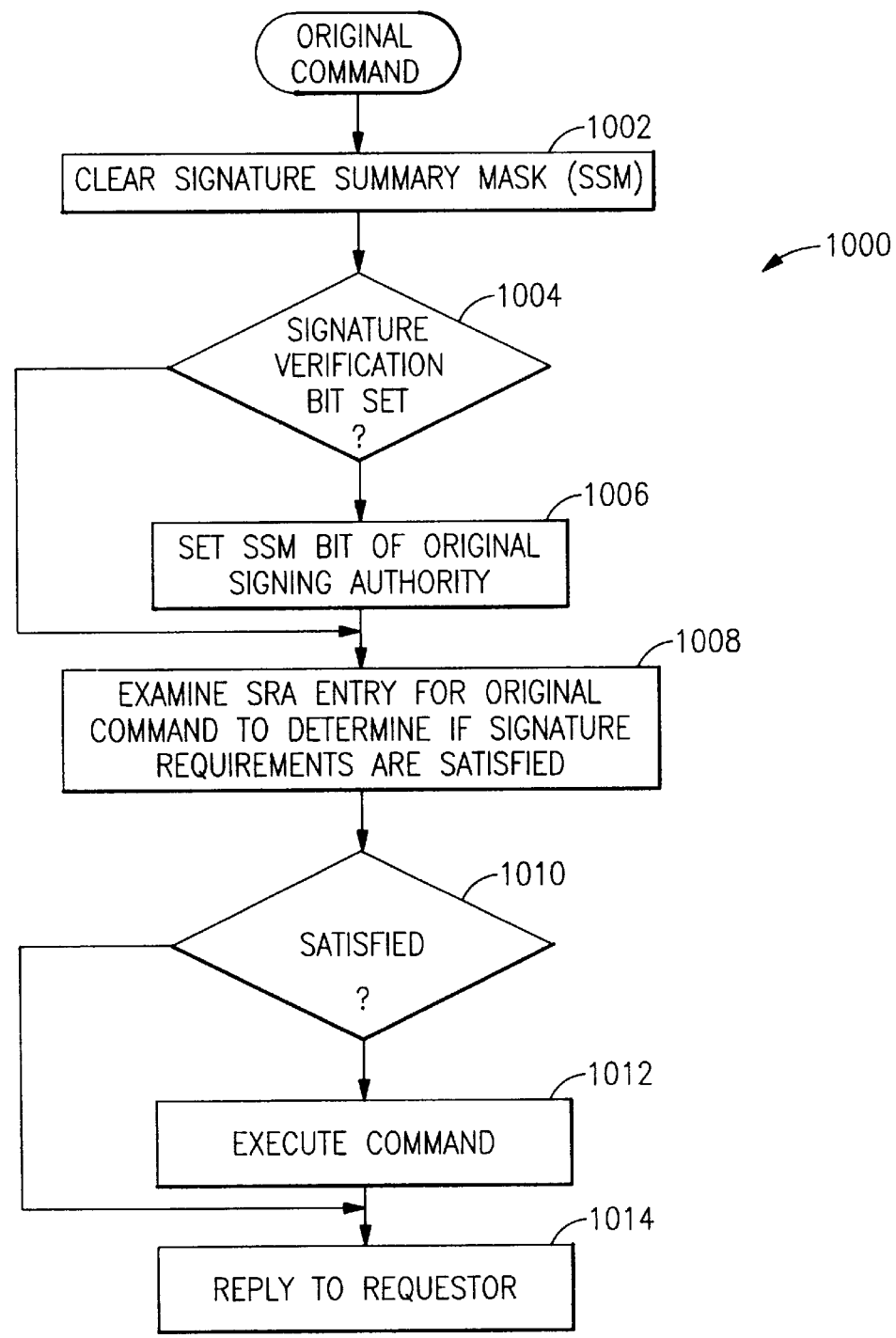
FIG. 10 shows the general procedure for processing the original command of a multiple-signature command.

FIG. 10 shows the general procedure 1000 for processing the original command of a multiple-signature command. When a command 116 is loaded into the PCR 150 all SSM bits are set to zero (step 1002). Then, if PKSC signature verification (CCC bit 7) is one (step 1004) and signature verification for the command is successful, the SSM bit corresponding to the authority 104 signing the command 116 is set to one (step 1006).

The SRA entry 602 for the command 116 in the PCR 150 is then examined to determine if all three signature requirement specifications for the pending command are satisfied (step 1008). For this to occur, for each of the three requirements, the required number (as indicated by a particular count 704) of authorities who are permitted to concur (as indicated by the corresponding mask 706) have in fact concurred. If not, then a normal completion reply is returned (step 1014). If all three signature requirement specifications are satisfied (step 1010), then the PCR execution phase for the pending command 116 takes place (step 1012) before the normal completion reply is returned for the original command (step 1014).

As described below, each time a Cosign command 116 is successfully executed, the SSM bit corresponding to the signing authority 104 of the Cosign command is set to one. Commands 116 may be loaded and cosigned by any of the authorities 104 regardless of whether that authority is listed in the signature requirement array 156 as a required signer for the command, but the pending command is not executed until all the signature requirements for the particular command are satisfied.

When the PKSC signature control is zero, commands 116 may be loaded into the PCR 150 even though the signature 118 for the command is not valid. However, the SRA entry 602 for the command must 116 be satisfied before the pending command is executed. Thus, when the PKSC signature control is zero, and all the count fields 704 in the SRA entry 602 are zero, then the command 116 is executed without requiring any valid signature 118. But if any count field 704 in the SRA entry 602 is nonzero, then valid cosignatures 118 are required to execute the command even when the PKSC signature control is zero.

Bits 32–63 of PCR 150 contain a command section A (804) for storing fields 414–417 of the original multiple-signature command.

Bytes 8–23 of PCR 150 contain a pending command identifier (PCID) 806 formed from the hash pattern of the multiple-signature command. The Cosign command 116 to be described contains a 16-byte field which must match this value in order to cosign the command.

Bytes 24–151 of the PCR contain a command section B (808) for storing the field 440 of the original multiple-signature command.

Pending command register (PCR) 150 is 152 bytes in length and can be queried by means of a Query Pending Command Register (QPC) PKSC query 114. PCR 150 is set to all zeros by crypto module reset. PCR 150 is set to all zeros at the completion of PCR execution and the PCR is also set to all zeros whenever a single-signature command 116 or self-signature initialization command is accepted.

PKSC Cosignature Command

Although there are ten different PKSC multiple-signature commands 116, a single PKSC command, the Cosign command, can be used to provide the additional signatures 118 required for any of the ten multiple-signature commands. The Cosign command 116 also provides signatures 118 for the two-signature initialization command Load Crypto Configuration Control (LCC).

After one authority 104 has loaded the PCR 150 with a multiple-signature command 116, another authority can use the Query Pending Command Register (QPC) query to determine what command is pending and thus determine whether the authority is willing to cosign the pending command. The 16-byte pending command ID (PCID) field 806 in the PCR 150 provides an authority 104 with the assurance that the command being cosigned has not been changed since it was examined by the authority.

Figure 9:
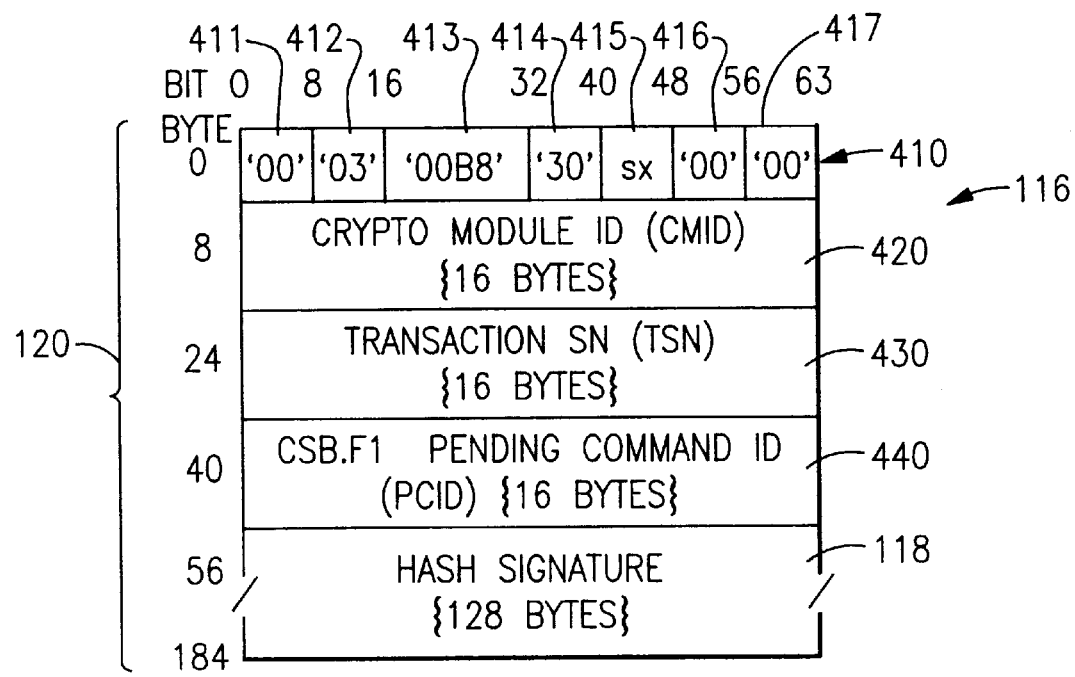
FIG. 9 shows the format of a Cosign (COS) command.

FIG. 9 shows the format of a Cosign command 116 in the disclosed embodiment. It conforms to the general format shown in FIG. 4, with fields 413–414 and 416–417 having the respective hexadecimal values '00B8', '30', '00', '00' and field 415 containing the identifier (sx) of the issuing authority 104. In the case of the Cosign command, the command data 440 (CSB.F1) comprises the 16-byte pending command ID (PCID) obtained by querying the pending command register 150.

A Cosign PKSC command 116 is accepted only if the CSB.F1 field 440 of the request message 120 is not zero and matches the PCID 806 of the PCR 150. Thus, since the PCID 806 is changed each time the PCR 150 is loaded, a Cosign command 116 based on a previous command will not be accepted after the PCR is changed, and since the PCID is set to zero when the PCR is reset, the PCR cannot be cosigned while it is reset.

Figure 11:
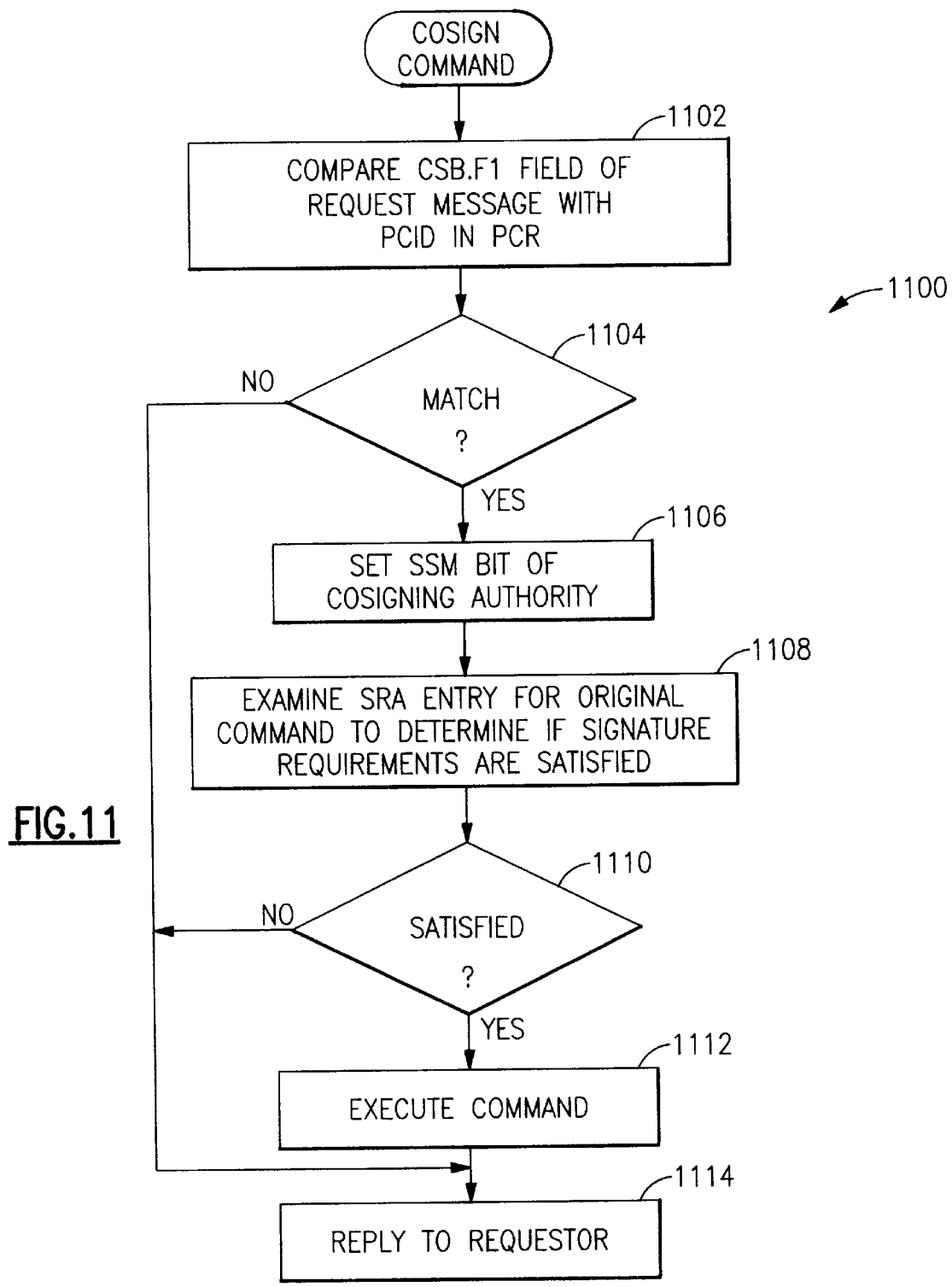
FIG. 11 shows the procedure for processing a Cosign command.

FIG. 11 shows the procedure 1100 for processing a Cosign command 116, assuming the signature verification for the command is successful. During execution of the Cosign command 116, crypto module 102 compares the CSB.F1 field 440 in the command with the PCID 806 in the pending command register 150 to determine if the two match (step 1102). If the CSB.F1 field 440 matches the PCID 806 in the pending command register 150 (step 1104), then the pending command 116 is cosigned for this authority 104. This is accomplished by setting bit sx of signature summary mask 802 to one in the pending command register 150, where sx is the authority identifier contained in field 415 of the Cosign command 116 (step 1106).

The SRA entry 602 for the command 116 in the PCR 150 is then examined to determine if all three signature requirement specifications for the pending command are satisfied (step 1108). If not, then a normal completion reply is returned (step 1114). If all three signature requirement specifications are satisfied (step 1110), then the PCR execution phase for the pending command 116 takes place (step 1112) before the normal completion reply is returned for the Cosign command (step 1114).

Signature verification always applies to COS regardless of the setting of the PKSC signature control (CCC bit 7).

Authorization Registers

Those registers which are replicated for each authority 104 are called authorization registers. The maximum number of authorities 104 supported is 16.

Authorization Public Modulus (APM)

The authorization public modulus is 128 bytes in length and can be queried by means of the QAR PKSC query command. Crypto module reset causes each APM to be set to zero, which is invalid.

Figure 14:
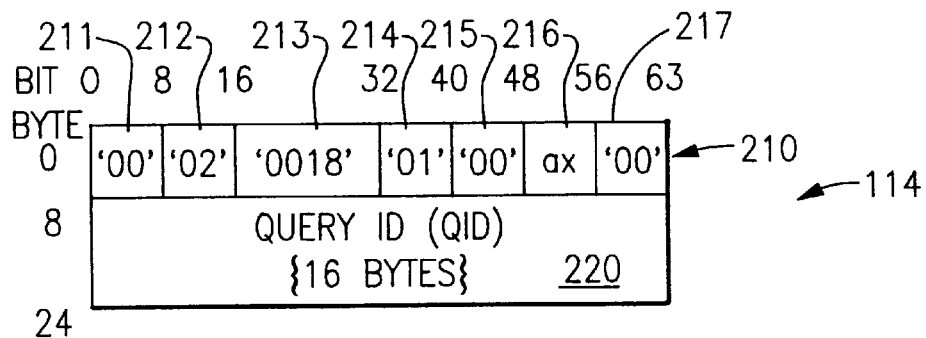
FIG. 14 shows the format of a Query Authorization Register (QAR) query.
Figure 15:
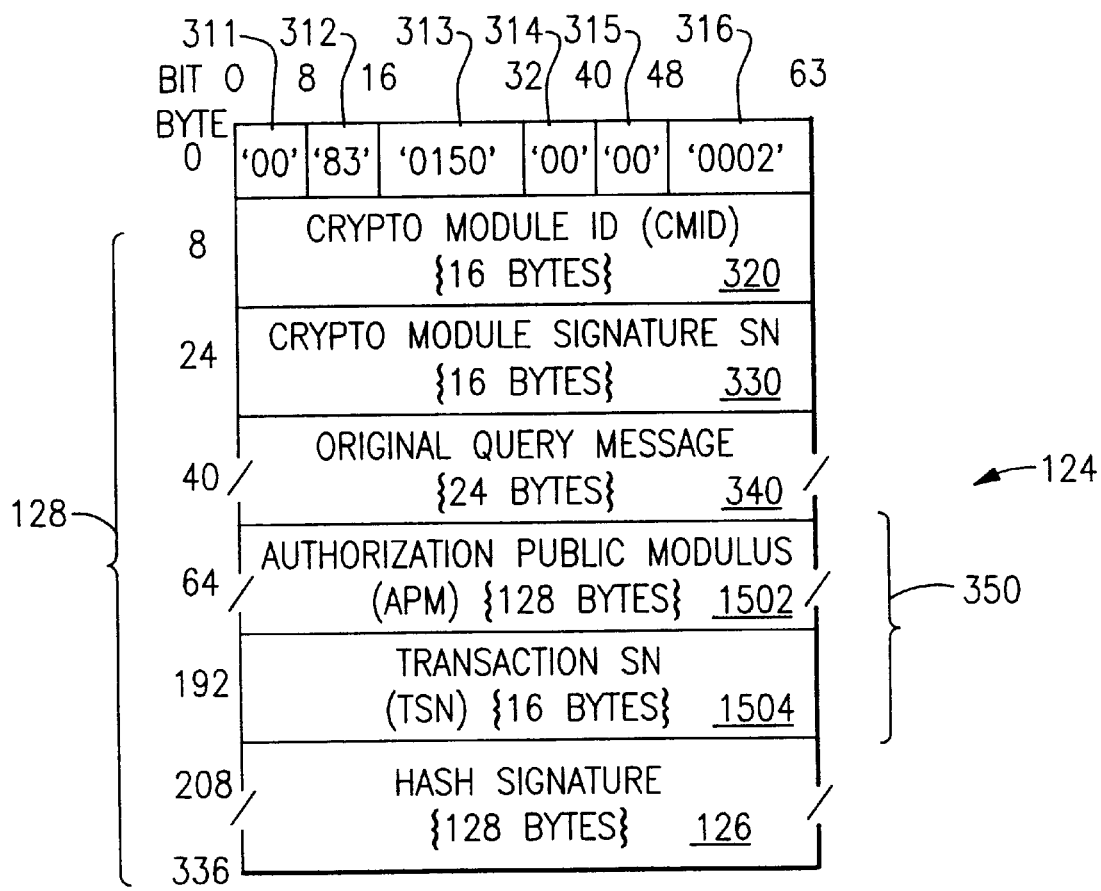
FIG. 15 shows the format of a reply to a QAR query.

FIG. 14 shows the format of a Query Authorization Register (QAR) query 114, while FIG. 15 shows the format of a reply 124 to a QAR query. In the query header 210, the field 214 ('01') identifies the query 114 as being a QAR query, while the field 216 (ax) identifies the particular authority 104 for which the information is being requested. In the reply 124, the return data 350 comprises a copy 1502 (128 bytes in length) of the authorization public modulus (APM) 136, followed by a copy 1504 of the transaction sequence number 138 (16 bytes in length).

During the initialization process controlled by the customer, each authorization register will be initialized with the public modulus of a particular authority 104. It is necessary, however, before the customer program begins, for an IBM supplied bootstrap program to be run. Since the APM of all authorization registers is reset to an invalid value by crypto module reset, the bootstrap program must set a valid value into at least one of these registers before the PKSC signature control (CCC bit 7) is set to one. It is suggested that the bootstrap program set the APM to the following value, which is the product of two primes: $(2^{512}-569)(2^{512}-629)$.

Transaction Sequence Number (TSN)

Associated with each authorization register is a 16-byte value called a transaction sequence number (TSN). The TSN can be queried by means of the QAR PKSC query command.

All commands requiring a signature by the authority also include a TSN in the command. The TSN is used to eliminate the possibility of an attacker successfully replaying a previously signed command. The use of the TSN depends on the setting of the PKSC TSN control (CCC bit 6). When CCC bit 6 is zero, the TSN in the command is ignored. When CCC bit 6 is one, the command is accepted only if the TSN in the command matches the current TSN for that authority. Regardless of whether the TSN in the command is tested, each time a command is accepted, the crypto module updates the TSN in the associated authorization register. (A command is considered to be accepted only when a reply code of '00' is returned.) The TSN is updated by incrementing the rightmost 8 bytes of the TSN by one; a carry, if any, out of the rightmost 8 bytes is ignored.

Whenever an authorization register is loaded, a new 16-byte random number is placed into the TSN for that register. Crypto module reset causes zeros to be placed into the TSN for each authorization register.

Crypto Module Signature Sequence Number (CMSSN)

The crypto module signature sequence number (CMSSN) is 16 bytes in length. The CMSSN is initialized to a random value by crypto module reset. All messages signed by the crypto module contain the current CMSSN. Each time, after it is used, the CMSSN is updated by incrementing the rightmost 8 bytes by one; a carry, if any, out of the rightmost 8 bytes is ignored.

Master Key Transfer

Figure 16:
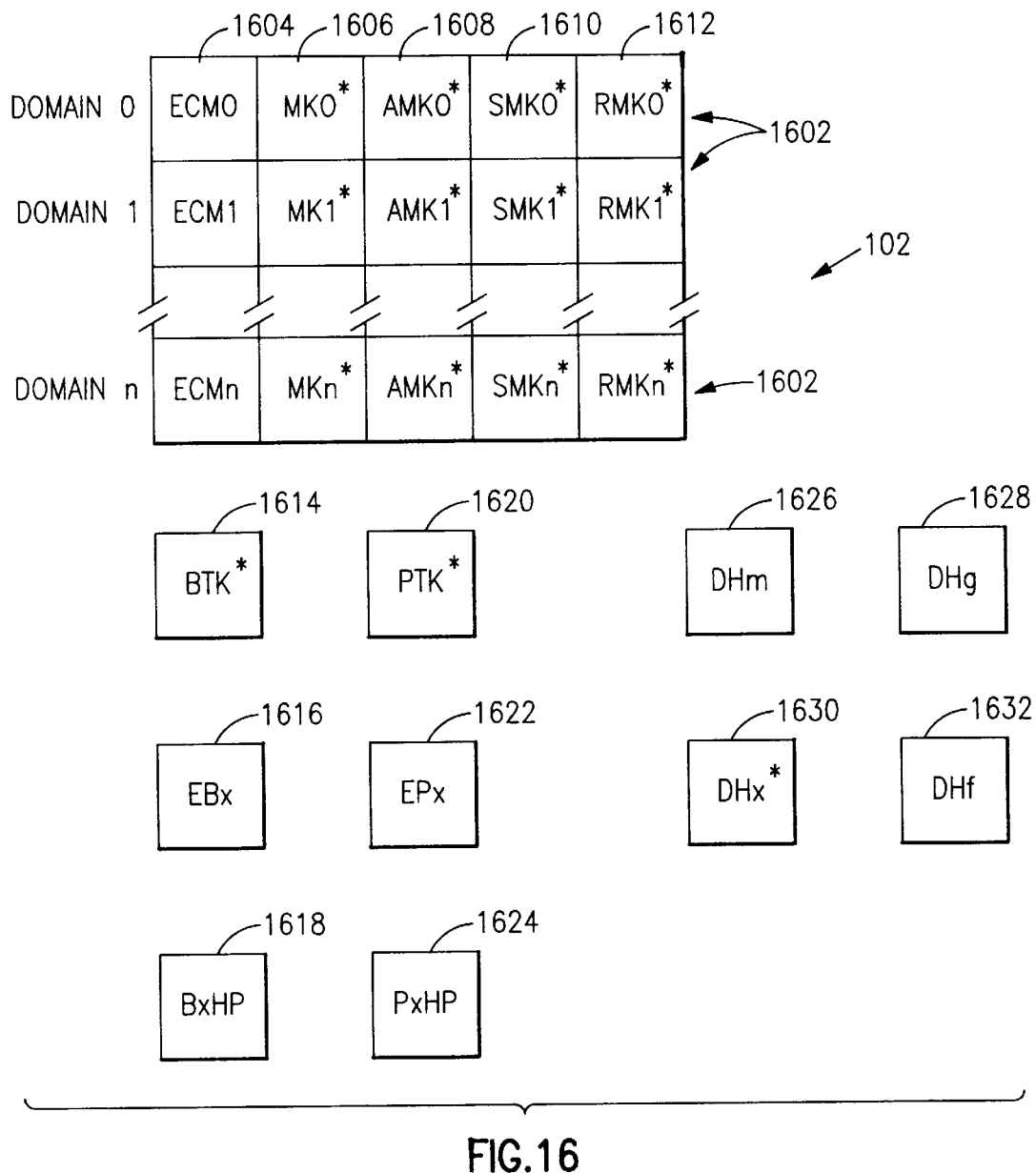
FIG. 16 shows some of the data structures of a particular crypto module that are involved in the transfer of master keys or encapsulated objects from one crypto module to another.

FIG. 16 shows some of the data structures of a particular crypto module 102 that are involved in the transfer of master keys or encapsulated objects from one crypto module to another. Crypto module 102 has a set of registers 1602 for each of a plurality of domains 0 to n. The set of registers 1602 for each domain i includes registers for an environment control mask (ECMi) 1604, a master key (MKi) 1606, an auxiliary master key (AMKi) 1608, a signature object master key (SMKi) 1610, and a receive object master key (RMKi) 1612. The various master keys MKi, AMKi, SMKi and RMKi are secret, as indicated by the asterisks in the figure. An authority 104 can obtain a hash pattern of their contents using appropriate queries 114, but cannot obtain the contents themselves.

Crypto module 102 also has a basic transport key (BTK) register 1614, an encrypted basic extracted key (EBX) register 1616, a basic extracted key hash pattern (BXHP) register 1618, a public key algorithm (PKA) transport key (PTK) register 1620, an encrypted PKA extracted key (EPX) register 1622, and a PKA extracted key hash pattern (BXHP) register 1624.

The basic transport key (BTK) register 1614 is 16 bytes in length. The basic transport key BTK is a secret quantity (as indicated by an asterisk in the figure) and cannot be queried directly, but the hash pattern can be queried by means of a QBT PKSC query command 114. The basic transport key BTK is set invalid by crypto module reset.

The encrypted basic extracted key (EBX) register 1616 is 16 bytes in length. The EBX register 1616 can be queried by means of a QBT PKSC query command 114. The EBX register 1616 is set to all zeros by crypto module reset.

The basic extracted key hash pattern (BXHP) register 1618 is 16 bytes in length. As part of the action of placing a key into the EBX register 1616, the hash pattern of the clear value of the key is generated and placed in BXHP register 1618. The BXHP register 1618 can be queried by means of a QBT PKSC query command 114. The BXPH register 1618 is set to all zeros by crypto module reset.

The PKA transport key (PKT) register 1620 is 48 bytes in length. The PKA transport key PKT is a secret quantity (as indicated by an asterisk in the figure) and cannot be queried directly, but the hash pattern can be queried by means of a QPT PKSC query command 114. The PKA transport key PKT is set invalid by crypto module reset.

The encrypted PKA extracted key (EPX) register 1622 is 48 bytes in length and holds encrypted keys of 24 and 48 bytes in length. Key of length 24 are concatenated on the left with 24 bytes of random bits before being encrypted. The EPX register 1622 can be queried by means of a QPT PKSC query command 114. The EPX register 1622 is set to all zeros by crypto module reset.

The PKA extracted key hash pattern (PXHP) register 1624 is 16 bytes in length. As part of the action of placing a key into the EPX register 1622, the hash pattern of the clear value of the key is generated and placed in PXHP register 1624. The PXHP register 1624 can be queried by means of a QPT PKSC query command 114. The PXHP register 1624 is set to all zeros by crypto module reset.

Additional registers used in the Diffie-Hellman (DH) key agreement procedure described below include a DH modulus (DHm) register 1626, a DH generator (DHg) register 1628, a DH secret exponent (DHx) register 1630, and a DH first key part (DHf) register 1632.

The DH modulus (DHm) register 1626 is 128 bytes in length and can be queried by means of a QHM PKSC query command 114. DHm is set to all zeros by crypto module reset.

The DH generator (DHg) register 1628 is 128 bytes in length and can be queried by means of a QHG PKSC query command 114. DHg is set to all zeros by crypto module reset.

The DH secret exponent (DHx) register 1630 is 128 bytes in length. DHx is a secret quantity and cannot be queried. DHx is set invalid by crypto module reset.

The DH first key part (DHf) 1632 is 128 bytes in length and can be queried by means of a QHF PKSC query command. DHf is set to all zeros by crypto module reset.

FIG. 17 shows the general procedure 1700 for transferring a key part (such as MK1 or AMK1) from one crypto module 102 to another.

First, using the procedure to be described below, an authority establishes a basic transport key (BTK) as a shared secret between the source and target modules 102 (step 1702). At the end of this step, the transport key BTK is stored in the BTK register 1614 of each crypto module 102 involved in the transfer, but is not itself accessible to the authority 104.

The authority 104 then extracts the key part from the appropriate master key register of the source module 102, using the Extract and Encrypt Master Key (XEM) command 116 described below (step 1704). Referring also to FIG. 18, this command 116 encrypts the key part in question ("source key") under the transport key BTK in register 1614 and places the result in EBX register 1616, where it is freely available to the requesting authority 104; a hash pattern of the extracted key is also placed in BXHP register 1618.

Thereafter, the authority loads the key part that it has obtained in encrypted form into the appropriate master key register of the target module 102, using the Load Key Part (LKP) command 116 described below (step 1706). Referring also to FIG. 19, this command 116 decrypts the key part under the transport key BTK in the register 1614 of the target module 102 and places the result in the appropriate master key register of that module.

As noted above, during procedure 1700 the authority 104 has access only to the version of the transferred key part that is encrypted under the transport key BTK. The authority does not have access to either the unencrypted key part or the transport key, both of which are kept in protected environments by the crypto modules 102 involved in the transfer. Thus, the procedure is secure against leakage to unauthorized third parties of the key that is being transferred.

Figures 20, 21:
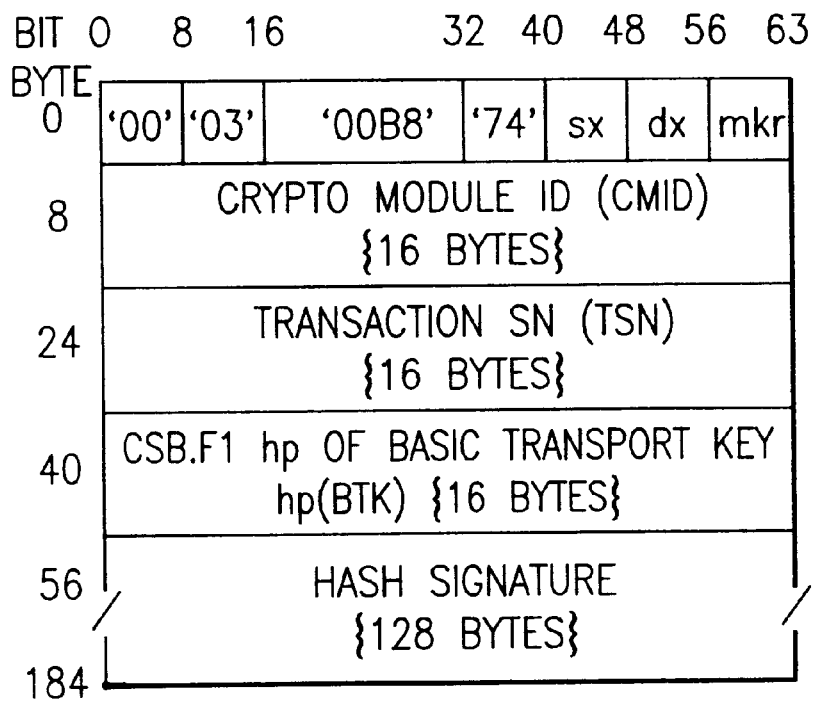
FIG. 20 shows the format of the Extract and Encrypt Master Key (XEM) command.
FIG. 21 shows the detailed definition of the mkr field of he XEM command.

FIG. 20 shows the format of the Extract and Encrypt Master Key (XME) command 116. In the first double word (64 bits), dx identifies the particular domain i and mkr the particular register from which the key is extracted. FIG. 21 shows the detailed definition of the mkr (master key register identification) field.

SRA entry 4 contains the signature requirement specifications for XEM.

Figure 23:
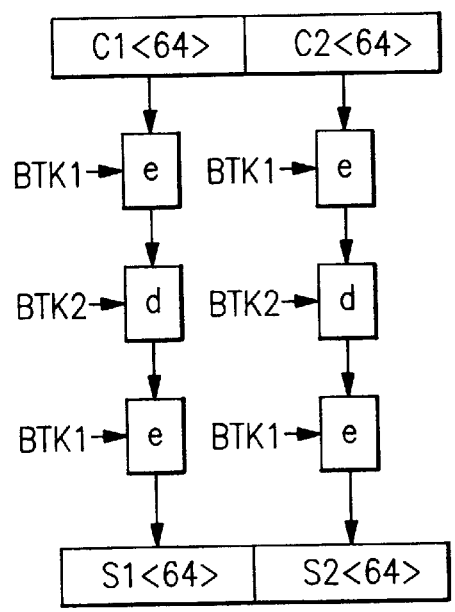
FIG. 23 shows the etk2 encryption algorithm used by the XEM command.

The 16-byte key indicated by the mkr field in the domain indicated by the dx field is called the source key. The hash pattern of the 16-byte source key is placed in the basic extracted key hash pattern (BXHP) register 1618. The source key is encrypted under the basic transport key BTK using the etk2 algorithm and the 16-byte result is placed in the encrypted basic extracted key (EBX) register 1616. (The etk2 algorithm is used in the PKSC facility to protect a 128-bit key under the 128-bit basic transport key BTK and is shown in FIG. 23.) If the indicated key is not valid then all zeros are placed in the BXHP and EBX registers 1618 and 1616.

Figure 22:
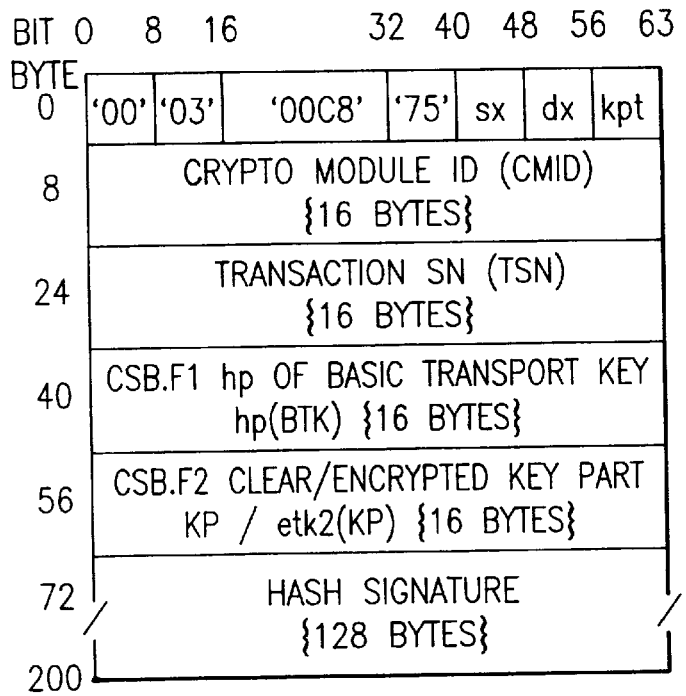
FIG. 22 shows the format of the Load Key Part (LKP) command.

FIG. 22 shows the format of the Load Key Part (LKP) command 116. SRA entry 5 contains the signature requirement specifications for LKP.

Figure 24:
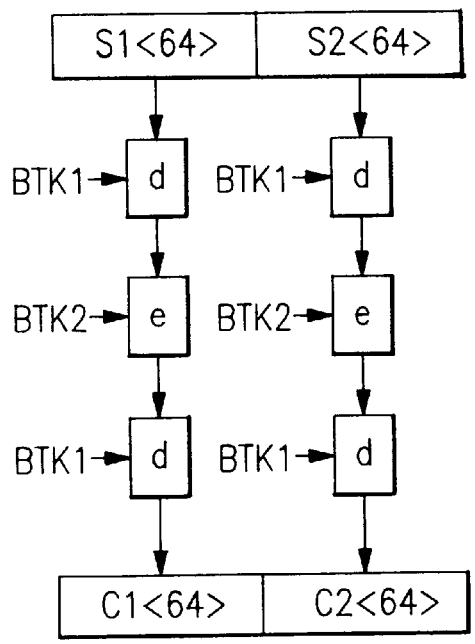
FIG. 24 shows the dtk2 decryption algorithm used by the LKP command.

When the kpt field specifies an encrypted key part, the 16-byte CSB.F2 field is decrypted under the basic transport key BTK using the dtk2 algorithm and the resulting 16-byte value is called the input key part. (The dtk2 algorithm is used to decrypt information encrypted by the etk2 algorithm and is shown in FIG. 24.) When the kpt field specifies a clear key part, CSB.F2, is used unchanged. In either case, the resulting 16-byte value is called the input key part and its use depends on the value in the key part type (kpt) field. Depending on the kpt, the input key part may be discarded, may be placed in the master key register 1606, may be loaded into or combined with the contents of the auxiliary master key register 1608, or may be placed in the next available key part entry for the specified domain. When the key part is placed in the key part queue entry, the DEA key parity of the input key part is not changed. However, if the input key part is used as a direct key part, the resulting value in the target master key, or auxiliary master key register, is set to odd DEA key parity. (Odd DEA key parity is obtained by setting bit 7 of each byte such that there are an odd number of ones in bits 0–7.)

Encapsulated Object Transfer

Encapsulated objects are transferred in a manner similar to that described above for master keys, except that there is an additional encryption or decryption step at each end as a consequence of the encapsulation process.

Figure 25:
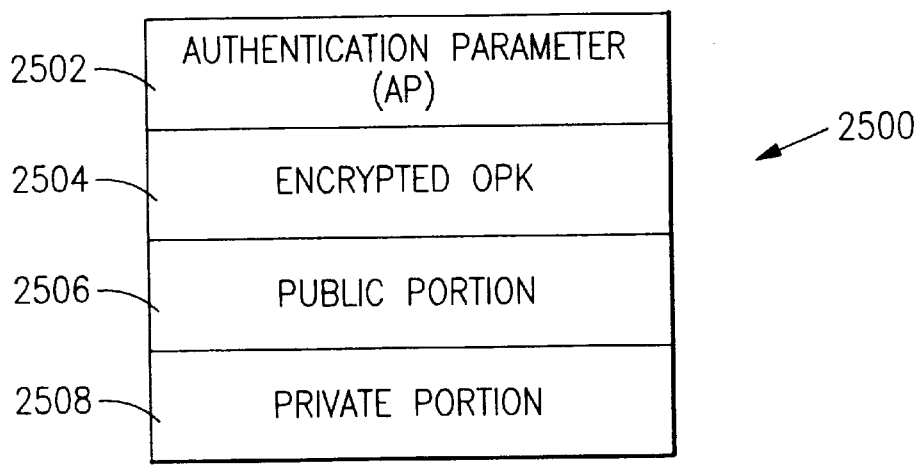
FIG. 25 shows an encapsulated object that is transferred in accordance with the present invention.

FIG. 25 shows a typical encapsulated object 2500 that is transferred in accordance with the present invention. Object 2500 may be a decryption key or a signature key, however the particular use of the object is unimportant. As shown in the figure, object 2500 comprises an authentication parameter (AP) 2502 (such as a hash of the remainder of the object), followed by an encrypted object protection key (OPK) 2504, a public portion 2506, and a private portion 2508 encrypted under the OPK. As a particular example, if object 2500 is an RSA key, public portion 2506 may contain the public modulus, while the private portion 2508 may contain the secret exponent.

In the present embodiment, the key used to encrypt the object protection key 2504 depends on the nature of the object 2500. If the object 2500 is a signature key, then the SMK key for the particular domain is used to encrypt OPK. On the other hand, if the object is an RSA key, then the RMK key is used to encrypt OPK. Because of this encapsulation of the protected portion 2508 of object 2500, the object can be safely stored outside of the crypto module 102.

Figure 26:
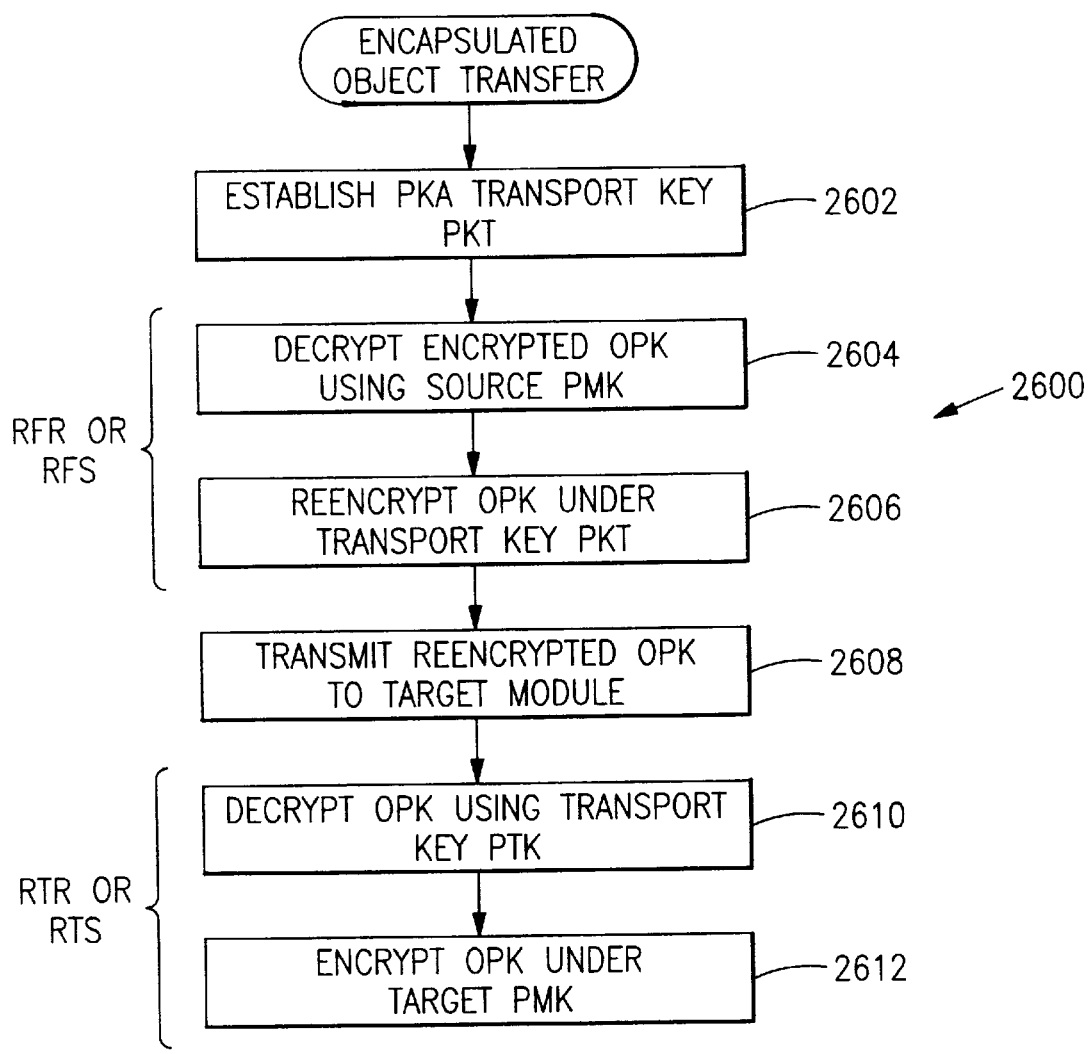
FIG. 26 shows the general procedure for transferring an encapsulated object from one crypto module to another.

FIG. 26 shows the general procedure 2600 for transferring a encapsulated object 2500 from one crypto module 102 to another.

First, using the procedure to be described below, an authority establishes a PKA transport key (PTK) as a shared secret between the source and target modules 102 (step 2602). At the end of this step, the transport key PTK is stored in the PTK register 1620 of each crypto module 102 involved in the transfer. The PKA transport key (PTK) register is 48 bytes (384 bits) in length. The PKA transport key PTK is a secret quantity and cannot be queried directly, but the hash pattern hp(PTK) can be queried by means of a Query PKA Transport Key (QPT) query 114. The PKA transport key PTK is set invalid by crypto module reset.

Figure 27:
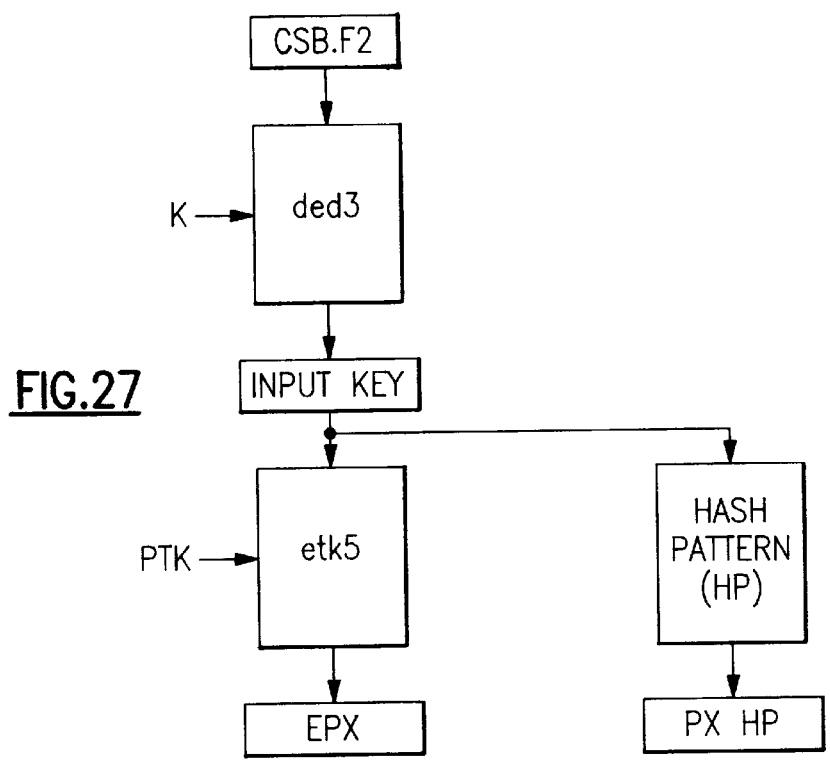
FIG. 27 shows the data transformations performed by the Reencipher From SMK (RFS) and Reencipher From RMK (RFR) commands.
Figure 28:
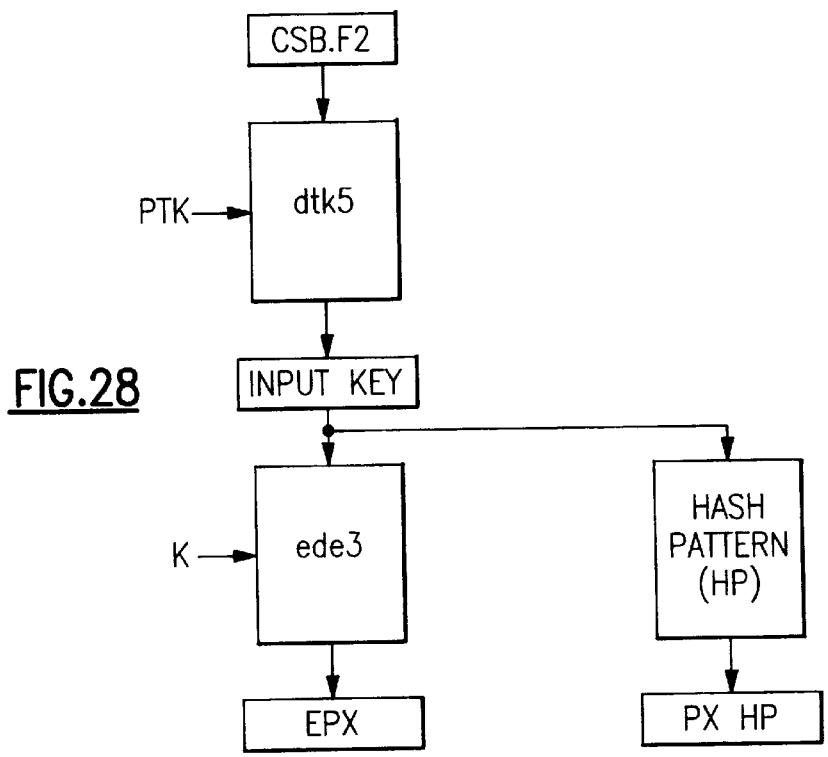
FIG. 28 shows the data transformations performed by the Reencipher To SMK (RTS) and Reencipher To RMK (RTR) commands.

The authority 104 then decrypts the object protection key OPK that is encrypted under a master key PMK (either SMK or RMK) (step 2604) and then reencrypts OPK under the transport key PTK (step 2606), using either the Reencipher From SMK (RFS) or Reencipher From RMK (RFR) command 116, depending on the master key PMK. Referring also to FIG. 27, this command 116 encrypts the object protection key (OPK) in question under the transport key PTK in register 1620 and places the result in EPX register 1622.

The EPX register 1622 is 48 bytes in length and holds encrypted keys of 24 and 48 bytes in length. Keys of length 24 are concatenated on the left with 24 bytes of random bits before being encrypted. The EPX register 1622 can be queried by means of a QPT query 114. The EPX register 1622 is set to all zeros by crypto module reset.

As part of the action of placing a key into the EPX register 1622, the hash pattern of the clear value of the key is generated and placed in PXHP register 1624. The PXHP register 1624 is 16 bytes in length. The PXHP register 1624 can be queried by means of a QPT query 114. The PXHP register 1624 is set to all zeros by crypto module reset.

The authority 104 then transmits the object protection key OPK, encrypted under the transport key PTK, to the target module 102 (step 2608).

Thereafter, on the target module 102, the authority 104 decrypts the object protection key OPK that is encrypted under the transport key PTK (step 2610) and then reencrypts OPK under the selected PKA master key PMK of the target domain (step 2612), using either the Reencipher To SMK (RTS) or Reencipher To RMK (RTR) command 116, depending on the master key PMK. Referring also to FIG. 27, this command 116 encrypts the object protection key (OPK) in question under the master key PMK in register 1620 and places the result in the EPX register 1622 of the target module, where it is freely available to the requesting authority 104; a hash pattern of the extracted key is also placed in PXHP register 1624.

During procedure 2600 the authority 104 has access only to the version of the object protection key OPK that is encrypted under the transport key PTK. The authority does not have access to either the unencrypted OPK or the transport key. Thus, the procedure is secure against leakage to unauthorized third parties of the key that is being transferred.

FIG. 29 shows the format of a Reencipher From SMK (RFS) or Reencipher From RMK (RFR) command 116. SRA entry 9 contains the signature requirement specifications for RFS and RFR.

The 48-byte CSB.F2 field is decrypted using the ded3 algorithm and the PKA master key (PMK) specified by the pmr field. The resulting 48-byte value is called the input key. The hash pattern of the input key is placed in the PKA extracted key hash pattern (PXHP) register. The input key is then encrypted using the etk5 algorithm and the PKA transport key PKT, and the resulting 48 byte value is placed in the encrypted PKA extracted key (EPX) register. The DEA key parity of the input key is not inspected or changed. If the PKA master key specified by the pmr field is not valid then all zeros are placed in the PXHP and EPX registers.

FIG. 30 shows the format of a Reencipher To SMK (RTS) or Reencipher To RMK (RTR) command 116. SRA entry 8 contains the signature requirement specifications for RTS and RTR.

The 48-byte CSB.F2 field is decrypted using the dtk5 algorithm and the PKA transport key PTK. The resulting 48-byte value is called the input key. The hash pattern of the 48-byte input key is placed in the PKA extracted key hash pattern (PXHP) register. The input key is encrypted using the ede3 algorithm and the PKA master key specified by the pmr field. The result is placed in the encrypted PKA extracted key (EPX) register. The DEA key parity of the input key is not inspected or changed. If the PKA master key specified by the pmr field is not valid then all zeros are placed in the PXHP and EPX registers.

Figure 32:
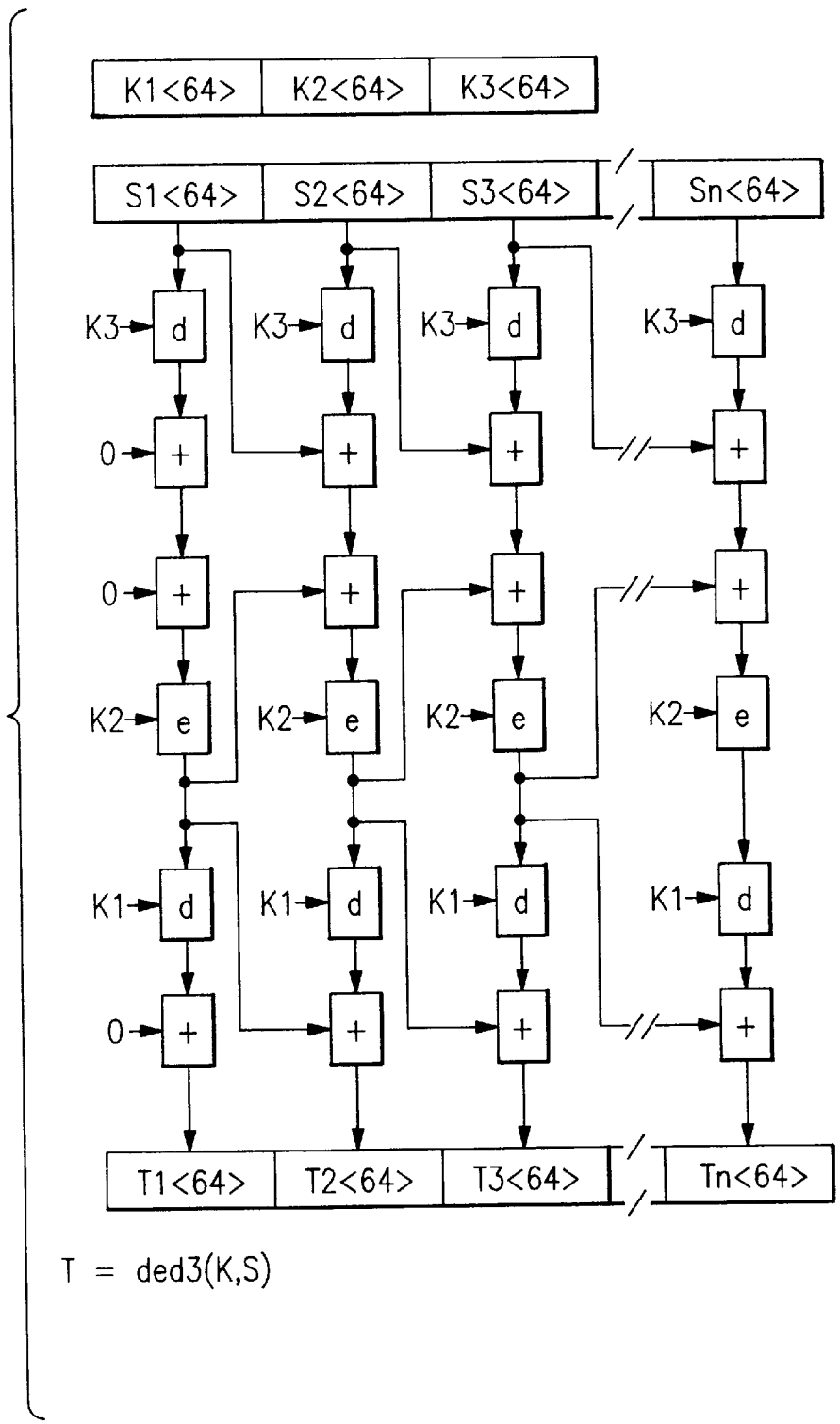
FIG. 32 shows the ded3 decryption algorithm used by the RFS and RFR commands.

FIG. 31 shows the ede3 encryption procedure referred to above, while FIG. 32 shows the corresponding ded3 decryption procedure. In the figures, +indicates bitwise modulo 2 (XOR) addition, e indicates DEA encryption and d indicates DEA decryption.

The ede3 algorithm uses a 192-bit key K=(K1, K2, K3) to encrypt any number of 64-bit blocks of information (T1, T2, . . . , Tn) to produce encrypted information (S1, S2, . . . , Sn). The ded3 algorithm is used to decrypt this information. In the PKA facility, ede3 is used only to protect the 48-byte object protection key (OPK) in an object.

Figure 33:
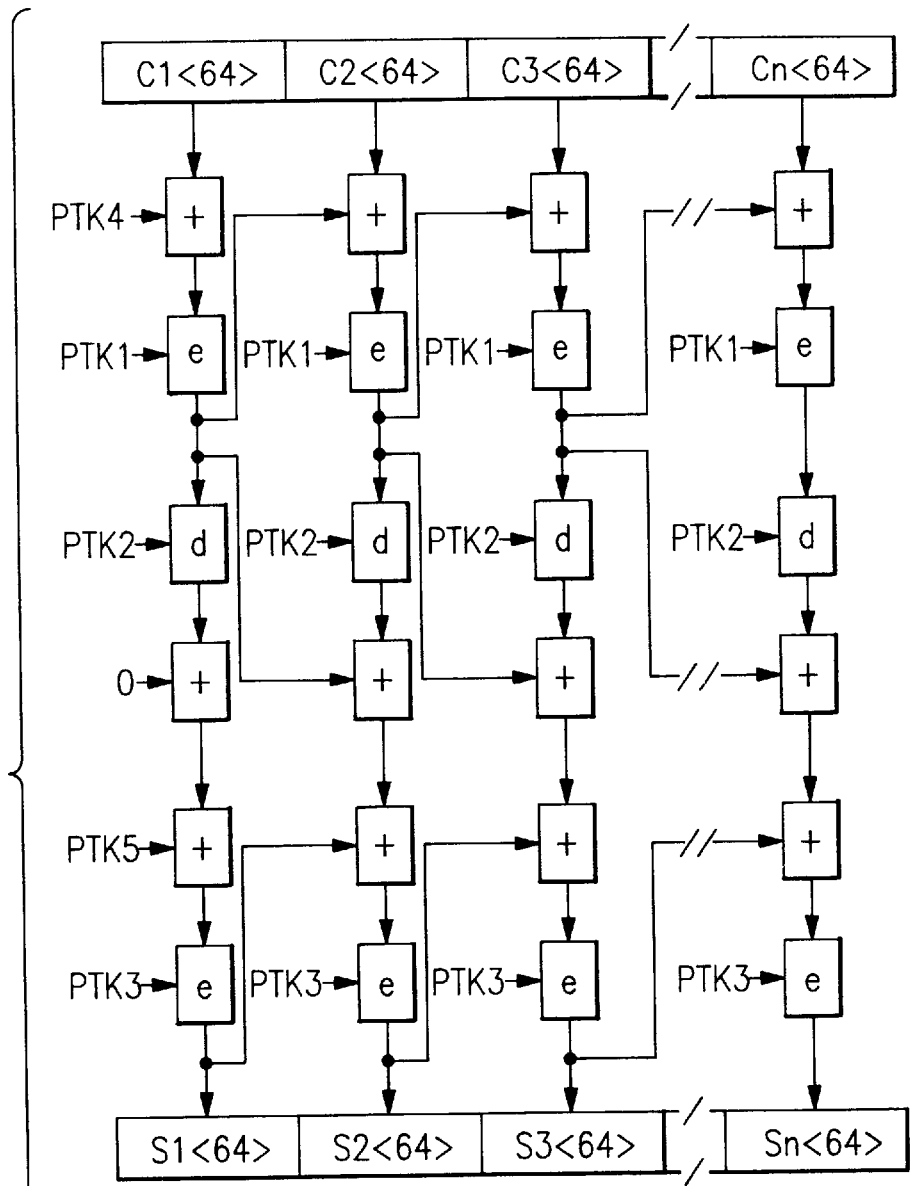
FIG. 33 shows the etk5 encryption algorithm used by the RFS and RFR commands.
Figure 34:
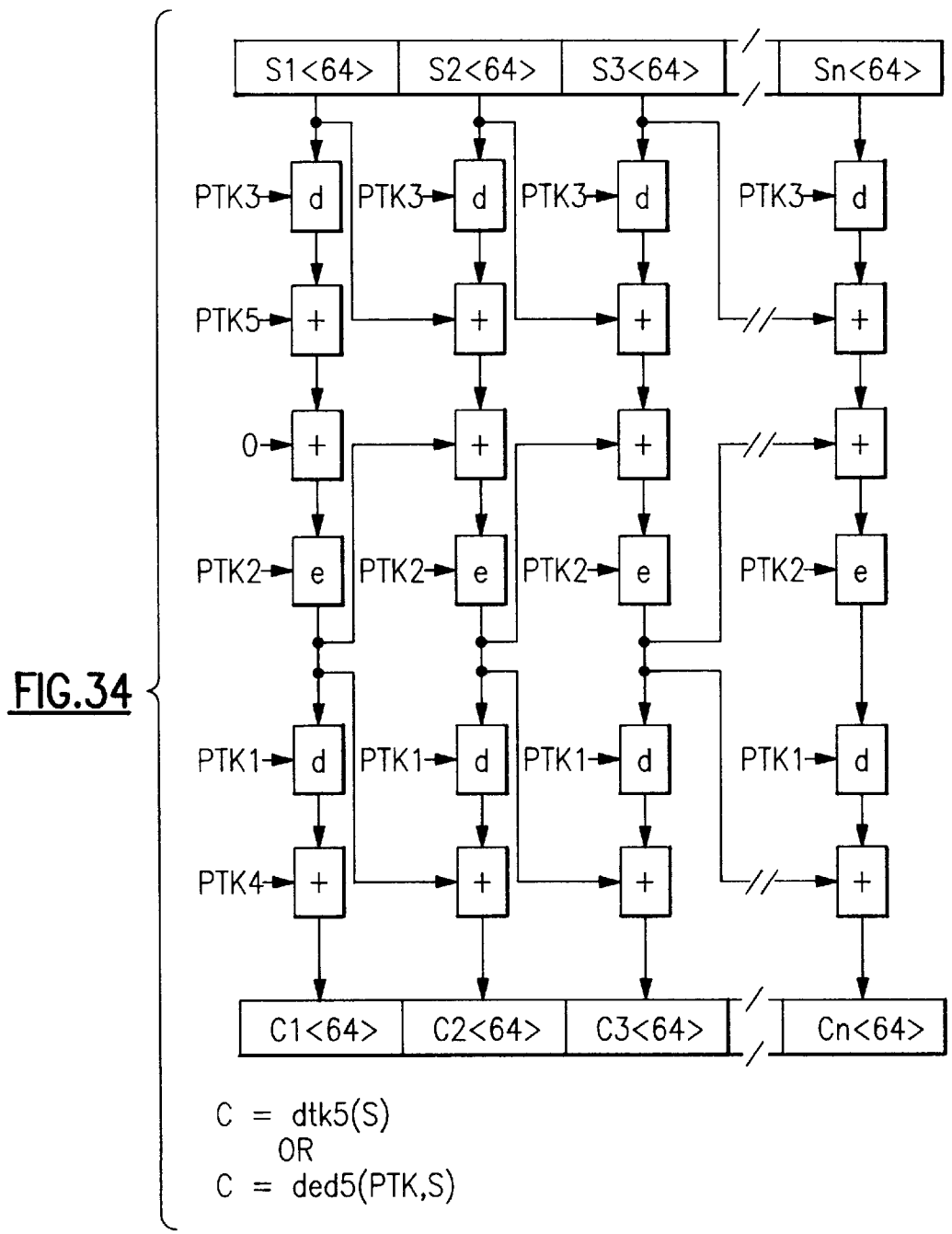
FIG. 34 shows the dtk5 decryption algorithm used by the RTS and RTR commands.

FIG. 33 shows the etk5 encryption procedure referred to above, while FIG. 34 shows the corresponding dtk5 decryption procedure. In FIGS. 33 and 34, the symbols +, e and d have the same meanings as in FIGS. 31 and 32. The etk5 algorithm is used in the PKSC facility to protect a 384-bit key under the 384-bit PKA transport key. The dtk5 algorithm is used to decrypt this information.

Diffie-Hellman (DH) Key Exchange Protocol

The PKSC provides a Diffie-Hellman (DH) key exchange protocol, which permits an authority 104 to set up a common 16-byte DEA key, called the basic transport key (BTK), between a workstation and the crypto module 102. One or more key parts can then be encrypted under the transport key.

The DH key exchange (or key agreement) is a well-known public key procedure whereby two parties (A and B) can establish a shared secret (from which DES keys can be generated, for example) without requiring the exchange of secret information between the parties. The parties first agree on a generator g and a prime modulus p, which are public values. The parties then randomly generate respective secret values X and Y, which they do not divulge, and send the other party a public value $g^X$ mod p or $g^Y$ mod p generated from the sender's secret value using modular exponentiation.

Each party then generates a shared secret value s from its own secret value X or Y and the public value $g^Y$ or $g^X$ received from the other party using the modular exponentiation operation $s=(g^Y \bmod p)^X \bmod p$ for party A or $s=(g^X \bmod p)^Y \bmod p$ for party B.

The two shared secret values s thus generated are the same and cannot be feasibly derived from the public values exchanged by the parties, hence the security of the procedure.

The DH protocol can also be used to establish a common transport key in two different crypto modules 102. The PKSC commands 116 are designed in such a way that this process can be audited. That is, one authority 104 can set up the common key and then other authorities can verify that the process has been performed correctly. Some of these auditing functions are:

1. The DH modulus p and the DH generator values g can be queried by all authorities 104. This permits each authority 104 to verify that weak values have not been used.
2. The PKSC functions which load the DH modulus p and the DH generator values g reset the transport keys. Thus, the auditor can verify that the DH modulus p and DH generator g have not been changed after the transport keys were generated.
3. The hash patterns of the transport keys in each crypto module 102 can be queried by all authorities 104. This permits each authority 104 to verify that the extracted key is being encrypted under a transport key that is known only to one other crypto module 102, and verify which crypto module that is.

DH transport keys are generated in crypto module 102 by means of three PKSC commands 116: Load DH Modulus (LHM); Load G and Generate DH First Part (LHG); and Combine DH Key Parts (CHK). An authority 104 generates transport keys BTK and PTK for secure transfer of a master key or encapsulated object by doing the following:

1. Invoke the LHM command to load a modulus p into the DHm register 1626.
2. Invoke the LHG command to load a generator g into the DHg register 1628, load a new random number X into the DHx register 1630, and compute a first key part $g^X$ mod p which is loaded into the DHf register 1632 and transmitted to the other module 102 involved in the transfer.
3. Invoke the CHK command to generate a shared secret value s from the first key part $g^Y$ received from the other module 102 and the secret exponent X stored in DHx register 1630 and derive transport keys BTK and PTK from the thus generated shared secret value s.

FIG. 35 shows the effect of these single-signature PKSC commands 116 on the transport registers 1614–1632 (FIG. 16) and the pending command register (PCR) 150 (FIG. 1). Note that a Load DH Modulus (LHM) command 116 with a CSB of all zeros can be used to clear all the transport information.

FIG. 36 shows the format of the Load DH Modulus (LHM) command 116.

The 128-byte CSB (DHm) is placed in the DH modulus register 1636. The DH generator (DHg) register 1628 and the DH first key part (DHf) register 1630 are set to zero; the DH secret exponent (DHx) register 1630 and both transport key (BTK and PTK) registers 1614 and 1620 are set invalid. Both encrypted extracted key (EBX and EPX) registers 1616 and 1622 are set to zeros, both extracted key hash pattern (BXHP and PXHP) registers 1618 and 1624 are set to zeros, and the pending command register (PCR) 150 is set to all zeros.

FIG. 37 shows the format of the Load G and Generate DH First Part (LHG) command 116.

The 128-byte CSB is placed in the DH generator (DHg) register 1628. A 1024-bit random number (DHx) is generated and placed in the DH secret exponent (DHx) register 1630. The DH generator (DHg) is raised to the DHx power modulo DHm and placed in the DH first key part (DHf) register 1632. Both transport keys (BTK and PTK) are set invalid. Both encrypted extracted key (EBX and EPX) registers 1616 and 1622 are set to zeros, both extracted key hash pattern (BXHP and PXHP) registers 1618 and 1624 are set to zeros, and the pending command register (PCR) 150 is set to all zeros. This action is shown in mathematical form as follows:

Let:

p=DH modulus (DHm)

g=DH generator (DHg)

X=DH secret exponent (DHx)

f=DH first key part (DHf)

Then:

g=CSB

X=new 1024-bit random number $f=g^X$ mod p

BTK=invalid

PTK=invalid
BXHP=0
EBX=0
PXHP=0
EPX=0

FIG. 38 shows the format of a Combine DH Key Parts (CHK) command 116.

The 128-byte CSB field $g^Y$ mod p is raised to the power of the DH secret exponent X modulo the DH modulus p to form an intermediate result s, called the shared secret value. Both transport key (BTK and PTK) registers 1614 and 1620 are then set using transport key derivation algorithms tkd2 and tkd6 (to be described) from the shared secret value s. Both encrypted extracted key (EBX and EPX) registers 1616 and 1622 are set to zeros, both extracted key hash pattern (BXHP and PXHP) registers 1618 and 1624 are set to zeros, and the pending command register (PCR) 150 is set to all zeros.

The intermediate result is called the shared secret value s, since it is assumed that CSB is the DH first key part from another party in a Diffie-Hellman key exchange (CSB=$g^Y$ mod p, where Y is the secret exponent held by the other party). It is also assumed that the other party has taken the DH first key part from this system ($g^X$ mod DHm) to perform the corresponding action. The actions by the two parties produce the same shared secret value ($g^{YX}$ mod p=$g^{XY}$ mod p).

The action on this system is shown in mathematical form as follows:

Let:
k=CSB (=$g^Y$ mod p)
p=DH modulus (DHm)
g=DH generator (DHg)
X=DH secret exponent (DHx)
s=shared secret value Then:
s=$k^X$ mod p (=$g^{YX}$ mod p=$g^{XY}$ mod p)
BTK=tkd2(s)
PTK=tkd6(s)
BXHP=0
EBX=0
PXHP=0
EPX=0

Figure 39:
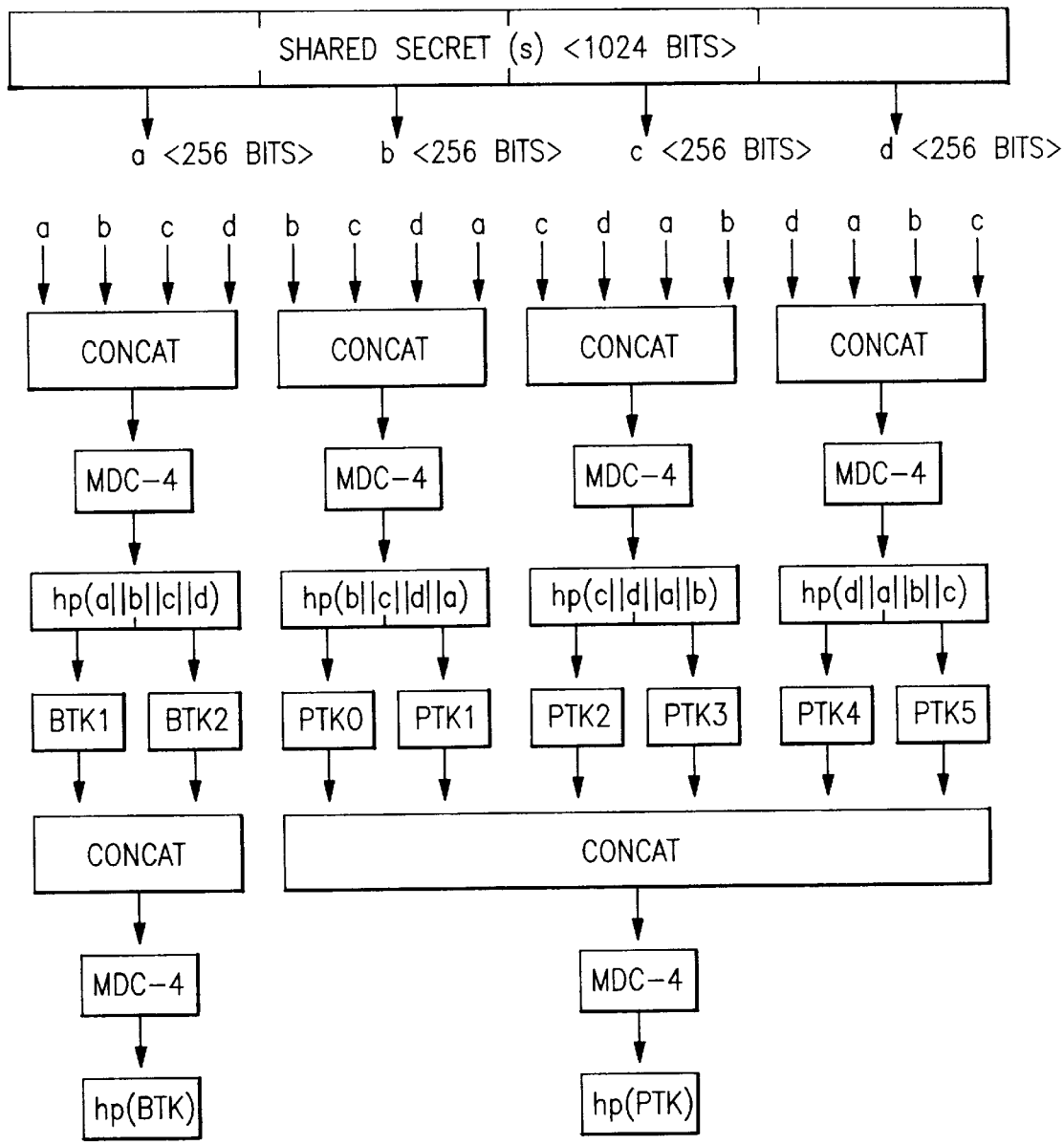
FIG. 39 shows the procedure for deriving the transport keys BTK and PTK and their associated hash patterns from the shared secret value.

FIG. 39 shows the 2-byte transport key derivation procedure (tdk2) for generating the basic transport key (BTK) and the associated hash pattern hp(BTK) from the shared secret value s, as well as the 6-byte transport key derivation procedure (tkd6) for generating the PKA transport key (PTK) and the associated hash pattern hp(PTK) from the shared secret value s.

Four different 128-bit hash patterns (using MDC-4) are generated from four rotations of the shared secret s. The 128-bit BTK register 1614 is set from one of these hash patterns, and the 384-bit PTK register 1620 is set from the other three. The transport keys BTK and PTK are set directly from these hash patterns with no adjustment in the DEA key parity.

BTK consists of two 8-byte blocks numbered in one origin as BTK1 and BTK2, respectively. PTK consists of six 8-byte blocks numbered in zero origin as PTK0 through PTK5. PTK0, the first 8-byte block of PTK, can be considered as padding; it is not used in the etk5 and dtk5 encryption and decryption algorithms described above, but it does participate in generation of the hash pattern hp(PTK).

Conclusion

The invention may be implemented as any suitable combination of hardware and software or microcode (i.e., a machine-readable program of instructions tangibly embodied on a program storage devices) executing on one or more hardware machines. While particular embodiments have been shown and described, various modifications will be apparent to those skilled in the art.

What is claimed is:

1. In an information handling system in which secret information is maintained within a first protected environment, a method of transferring said secret information from said first protected environment to a second protected environment, said method being performed by one or more authorities, said information within said protected environments being unobtainable in clear form by said one or more authorities, said method comprising the steps of:

establishing within said first and second protected environments a shared secret transport key that is obtainable in clear form only within said first and second protected environments and is unobtainable in clear form by said one or more authorities;

encrypting said secret information within said first protected environment using said transport key to generate encrypted secret information that is obtainable in encrypted form by at least one of said one or more authorities; and decrypting said encrypted secret information within said second protected environment using said transport key to regenerate the original secret information within said second protected environment, said regenerated secret information being unobtainable in clear form by said one or more authorities.

2. The method of claim 1 in which said transport key is established in response to one or more signed commands issued by one of said one or more authorities from outside said first and second protected environments using a secret signature key held by said one of said one or more authorities outside said first and second protected environments.

3. The method of claim 1 in which said transport key is established using a public key procedure from secret values obtainable in clear form only within said first and second protected environments.

4. The method of claim 3 in which said public key procedure is a Diffie-Hellman procedure.

5. The method of claim 1 in which said encrypting step is performed in response to a signed command issued by one of said one or more authorities from outside said first and second protected environments using a secret signature key held by said one of said one or more authorities outside said first and second protected environments.

6. The method of claim 1 in which said decrypting step is performed in response to a signed command issued by one of said one or more authorities from outside said first and second protected environments using a secret signature key held by said one of said one or more authorities outside said first and second protected environments.

7. The method of claim 1 in which said secret information is a master key.

8. The method of claim 1 in which said secret information is encrypted within said first protected environment under a master key, said method further comprising the step of:

decrypting said secret information within said first protected environment using said master key prior to encrypting said secret information under said transport key.

9. The method of claim 1 in which said secret information is encrypted within said second protected environment under a master key, said method further comprising the step of:

encrypting said secret information within said second protected environment using said master key subsequent to decrypting said secret information using said transport key.

10. The method of claim 1 in which said secret information is an object protection key used to protect an object maintained outside said protected environments.

11. A program storage device readable by a machine, tangibly embodying a program of instructions executable by the machine to perform the method steps of claim 1.

12. In an information handling system in which secret information is maintained within a first protected environment, apparatus for transferring said secret information from said first protected environment to a second protected environment, said apparatus being invoked by one or more authorities, said information within said protected environments being unobtainable in clear form by said one or more authorities, said apparatus comprising:

means for establishing within said first and second protected environments a shared secret transport key that is obtainable in clear form only within said first and second protected environments and is unobtainable in clear form by said one or more authorities;

means for encrypting said secret information within said first protected environment using said transport key to generate encrypted secret information that is obtainable in encrypted form by at least one of said one or more authorities; and means for decrypting said encrypted secret information within said second protected environment using said transport key to regenerate the original secret information within said second protected environment, said regenerated information being unobtainable in clear form by said one or more authorities.

13. The apparatus of claim 12 in which said secret information is encrypted within said first protected environment under a first master key, said apparatus further comprising:

means for decrypting said secret information within said first protected environment using said first master key prior to encrypting said secret information under said transport key.

14. The apparatus of claim 12 in which said secret information is encrypted within said second protected environment under a second master key, said apparatus further comprising:

means for encrypting said secret information within said second protected environment using said second master key subsequent to decrypting said secret information using said transport key.

15. In an information handling system in which an object is encrypted under an object protection key that is encrypted under a first master key maintained within a first protected environment, a method of transferring said object protection key from said first protected environment to a second protected environment having a second master key, said method being performed by one or more authorities, said master keys within said protected environments being unobtainable in clear form by said one or more authorities, said method comprising the steps of:

establishing within said first and second protected environments a shared secret transport key that is obtainable in clear form only within said first and second protected environments and is unobtainable in clear form by said one or more authorities;

decrypting said object protection key within said first protected environment using said first master key to generate a clear object protection key within said first protected environment that is unobtainable in clear form by said one or more authorities;

encrypting said clear object protection key within said first protected environment using said transport key to generate an object protection key encrypted under said transport key that is obtainable in encrypted form by at least one of said one or more authorities;

transmitting said object protection key encrypted under said transport key from said first protected environment to said second protected environment;

decrypting said object protection key encrypted under said transport key within said second protected environment using said transport key to generate a clear object protection key within said second protected environment that is unobtainable in clear form by said one or more authorities; and reencrypting said clear object protection key within said second protected environment using said second master key to generate an object protection key encrypted under said second master key within said second protected environment that is unobtainable in clear form by said one or more authorities.

16. A program storage device readable by a machine, tangibly embodying a program of instructions executable by the machine to perform the method steps of claim 15.

17. In an information handling system in which an object is encrypted under an object protection key that is encrypted under a first master key maintained within a first protected environment, apparatus for transferring said object protection key from said first protected environment to a second protected environment having a second master key, said apparatus being invoked by one or more authorities, said master keys within said protected environments being unobtainable in clear form by said one or more authorities, said apparatus comprising:

means for establishing within said first and second protected environments a shared secret transport key that is obtainable in clear form only within said first and second protected environments and is unobtainable in clear form by said one or more authorities;

means for decrypting said object protection key within said first protected environment using said first master key to generate a clear object protection key within said first protected environment that is unobtainable in clear form said one or more authorities;

means for encrypting said clear object protection key within said first protected environment using said transport key to generate an object protection key encrypted under said transport key that is obtainable in encrypted form by at least one of said one or more authorities;

means for transmitting said object protection key encrypted under said transport key from said first protected environment to said second protected environment;

means for decrypting said object protection key encrypted under said transport key within said second protected environment using said transport key to generate a clear object protection key within said second protected environment that is unobtainable in clear form by said one or more authorities; and means for reencrypting said clear object protection key within said protected environment using said second master key to generate an object protection key encrypted under said second master key within said second protected environment that is unobtainable in clear form by said one or more authorities.

18. In an information handling system in which secret information is maintained within a first physically secure boundary, a method of transferring said secret information from said first physically secure boundary to a second physically secure boundary, said method being invoked by one or more authorities who are outside said physically secure boundaries and comprising the steps of:

establishing within said first and second physically secure boundaries a shared secret transport key that is obtainable in clear form only within said first and second physically secure boundaries;

conditionally accepting, within said first physically secure boundary, a first request from a requesting authority to encrypt said secret information within said first physically secure boundary using said transport key to generate encrypted secret information and return said encrypted secret information to the requesting authority; and conditionally accepting, within said second physically secure boundary, a second request from a requesting authority to decrypt said encrypted secret information using said transport key to regenerate the original secret information within said second physically secure boundary.

19. The method of claim 18 in which a public key of the authority making said first request is maintained within said first physically secure boundary, said first request containing a digital signature signed using a private key of said authority corresponding to said public key, said first request being accepted within said first physically secure boundary only if said digital signature is verified using said public key of said authority.

20. The method of claim 18 in which a public key of the authority making said second request is maintained within said second physically secure boundary, said second request containing a digital signature signed using a private key of said authority corresponding to said public key, said second request being accepted within said second physically secure boundary only if said digital signature is verified using said public key of said authority.

21. The method of claim 1 in which said first and second physically secure boundaries each have a unique key pair comprising a public key and a private key, said method including the additional step of:

providing from one of said physically secure boundaries in a response to a request a hash pattern of the shared secret transport key, said response including a digital signature signed using the private key of the physically secure boundary.

22. A program storage device readable by a machine, tangibly embodying a program of instructions executable by the machine to perform the method steps of claim 1.

23. In an information handling system in which secret information is maintained within a first physically secure boundary, apparatus for transferring said secret information from said first physically secure boundary to a second physically secure boundary, said apparatus being invoked by one or more authorities who are outside said physically secure boundaries and comprising:

means for establishing within said first and second physically secure boundaries a shared secret transport key that is obtainable in clear form only within said first and second physically secure boundaries;

means for conditionally accepting, within said first physically secure boundary, a first request from a requesting authority to encrypt said secret information within said first physically secure boundary using said transport key to generate encrypted secret information and return said encrypted secret information to the requesting authority; and means for conditionally accepting, within said second physically secure boundary, a second request from a requesting authority to decrypt said encrypted secret information using said transport key to regenerate the original secret information within said second physically secure boundary.

24. In an information handling system in which an object is encrypted under an object protection key encrypted under a first master key, said first master key being maintained within a first physically secure boundary, a method of transforming said object protection key encrypted under said first master key to an object protection key encrypted under a second master key maintained within a second physically secure boundary, said method being invoked by one or more authorities who are outside said physically secure boundaries and comprising the steps of:

establishing within said first and second physically secure boundaries a shared secret transport key that is obtainable in clear form only within said first and second physically secure boundaries;

conditionally accepting, within said first physically secure boundary, a first request from a requesting authority to decrypt said object protection key within said first physically secure boundary using said first master key to produce a first clear object protection key, reencrypt said first clear object protection key within said first physically secure boundary using said transport key to produce a first reencrypted object protection key, and return said first reencrypted object protection key to the requesting authority; and conditionally accepting, within said second physically secure boundary, a second request from a requesting authority to decrypt said first reencrypted object protection key within said second physically secure boundary using said transport key to produce a second clear object protection key, reencrypt said second clear object protection key within said second physically secure boundary using said second master key to produce a second reencrypted object protection key, and return said second reencrypted object protection key to the requesting authority.

25. A program storage device readable by a machine, tangibly embodying a program of instructions executable by the machine to perform the method steps of claim 1.

26. In an information handling system in which an object is encrypted under an object protection key encrypted under a first master key, said first master key being maintained within a first physically secure boundary, apparatus for transforming said object protection key encrypted under said first master key to an object protection key encrypted under a second master key maintained within a second physically secure boundary, said apparatus being invoked by one or more authorities who are outside said physically secure boundaries and comprising:

means for establishing within said first and second physically secure boundaries a shared secret transport key that is obtainable in clear form only within said first and second physically secure boundaries;

means for conditionally accepting, within said first physically secure boundary, a first request from a requesting authority to decrypt said object protection key within said first physically secure boundary using said first master key to produce a first clear object protection key, reencrypt said first clear object protection key within said first physically secure boundary using said transport key to produce a first reencrypted object protection key, and return said first reencrypted object protection key to the requesting authority; and means for conditionally accepting, within said second physically secure boundary, a second request from a requesting authority to decrypt said first reencrypted object protection key within said second physically secure boundary using said transport key to produce a second clear object protection key, reencrypt said second clear object protection key within said second physically secure boundary using said second master key to produce a second reencrypted object protection key, and return said second reencrypted object protection key to the requesting authority.

* * * * *